(12) United States Patent
Kasai et al.

(10) Patent No.: US 12,305,934 B2
(45) Date of Patent: May 20, 2025

(54) HEAT EXCHANGER AND METHOD FOR MANUFACTURING HEAT EXCHANGER

(71) Applicant: DAIKIN INDUSTRIES, LTD., Osaka (JP)

(72) Inventors: Masaya Kasai, Osaka (JP); Takema Nakazawa, Osaka (JP); Takahisa Sueoka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 186 days.

(21) Appl. No.: 18/114,554

(22) Filed: Feb. 27, 2023

(65) Prior Publication Data

US 2023/0213291 A1 Jul. 6, 2023

Related U.S. Application Data

(63) Continuation of application No. PCT/JP2021/033113, filed on Sep. 9, 2021.

(30) Foreign Application Priority Data

Sep. 23, 2020 (JP) ................................ 2020-158900

(51) Int. Cl.
  *F28F 3/08* (2006.01)
  *B23P 15/26* (2006.01)
  *F28F 3/10* (2006.01)

(52) U.S. Cl.
  CPC ............... *F28F 3/08* (2013.01); *B23P 15/26* (2013.01); *F28F 3/10* (2013.01)

(58) Field of Classification Search
  CPC ...... F28D 9/0068; F28D 21/0014; F28F 3/08; F28F 3/10; F28F 2230/00; F28F 2240/00; F28F 3/048
  See application file for complete search history.

(56) References Cited

U.S. PATENT DOCUMENTS 6,293,337 B1 * 9/2001 Strahle .................... F28F 3/044
  165/165
2008/0283217 A1 11/2008 Gagnon et al.

FOREIGN PATENT DOCUMENTS

JP          3-230096 A    10/1991
WO   WO-2020129130 A1 *  6/2020

OTHER PUBLICATIONS

Pdf translation of foreign reference WO 2020129130 A1 (Year: 2020).*

(Continued)

*Primary Examiner* — Len Tran
*Assistant Examiner* — Kamran Tavakoldavani
(74) *Attorney, Agent, or Firm* — GLOBAL IP COUNSELORS, LLP

(57) ABSTRACT

A heat exchanger includes partition members, alternately stacked spacing members, and seals. The spacing members include first and second spacing members forming the first and second passages. The first and second spacing members each have a frame portion along a periphery of the partition members. The frame portion of the first and second spacing members have first and second communication sections having first and second communication openings allowing the first and second passages to communicate with outside of the frame portion, and first and second partition walls separating the first and second passages from the outside of the frame portion. The frame portions of the first and second spacing members further have first and second notches provided in portions of the first and second partition walls, and open on an outer side surface of the first and second partition walls. The seals cover surfaces of the first and second notches.

7 Claims, 20 Drawing Sheets

(56) References Cited

OTHER PUBLICATIONS

Pdf is translation of foreign reference WO 2020129130 A1 (Year: 2020).*
International Search Report of corresponding PCT Application No. PCT/JP2021/033113 dated Nov. 2, 2021.
International Preliminary Report of corresponding PCT Application No. PCT/JP2021/033113 dated Apr. 6, 2023.
European Search Report of corresponding EP Application No. 21 87 2177.7 dated Aug. 19, 2024.

* cited by examiner

HEAT EXCHANGER AND METHOD FOR MANUFACTURING HEAT EXCHANGER

CROSS-REFERENCE TO RELATED APPLICATIONS

This is a continuation of International Application No. PCT/JP2021/033113 filed on Sep. 9, 2021, which claims priority to Japanese Patent Application No. 2020-158900, filed on Sep. 23, 2020. The entire disclosures of these applications are incorporated by reference herein.

BACKGROUND

Technical Field

The present disclosure relates to a heat exchanger and a method for manufacturing the same.

Background Art

U.S. Patent Application Publication No. 2008/0283217 discloses a heat exchanger configured by alternately stacking sheet members and frame members on top each other. In this heat exchanger, a first passage and a second passage are separated by the sheet members. This heat exchanger is provided for a ventilator, and causes outdoor air (supply air) supplied into a room and room air (exhaust air) exhausted out of the room to exchange heat.

The frame members of U.S. Patent Application Publication No. 2008/0283217 each have a frame portion provided along the periphery of the sheet member. The frame portions of the frame members stacked form the side surface of the heat exchanger. The frame portion of each frame member has communication openings for allowing communication with the first passage or the second passage. The communication openings are open on the side surface of the heat exchanger. (see FIGS. 7 to 11 of U.S. Patent Application Publication No. 2008/0283217)

SUMMARY

A first aspect of the present disclosure is directed to a heat exchanger including a plurality of flat sheet shaped partition members, spacing members alternately stacked with the partition members to keep a space between an adjacent pair of the partition members, and seals. The partition members are each sandwiched between a first passage and a second passage alternately provided. The spacing members include a first spacing member forming the first passage and a second spacing member forming the second passage. The first spacing member and the second spacing member each have a frame portion along a periphery of the partition members. The frame portion of the first spacing member has a first communication section having a first communication opening allowing the first passage to communicate with outside of the frame portion, and a first partition wall separating the first passage from the outside of the frame portion. The frame portion of the second spacing member has a second communication section having a second communication opening allowing the second passage to communicate with outside of the frame portion, and a second partition wall separating the second passage from the outside of the frame portion. The frame portion of the first spacing member further has first notches provided in portions of the first partition wall along the second partition wall of the second spacing member, and open on an outer side surface of the first partition wall. The frame portion of the second spacing member further has second notches provided in portions of the second partition wall along the first partition wall of the first spacing member, and open on an outer side surface of the second partition wall. The seals cover surfaces of the first notches and surfaces of second notches.

DETAILED DESCRIPTION OF EMBODIMENT(S)

An embodiment will be described below. A heat exchanger (10) of the present embodiment is a so-called total heat exchanger. This heat exchanger (10) is provided for a ventilator, and causes outdoor air (supply air) supplied into a room and room air (exhaust air) exhausted out of the room to exchange sensible heat and latent heat (moisture).

General Configuration of Heat Exchanger

Figure 1:
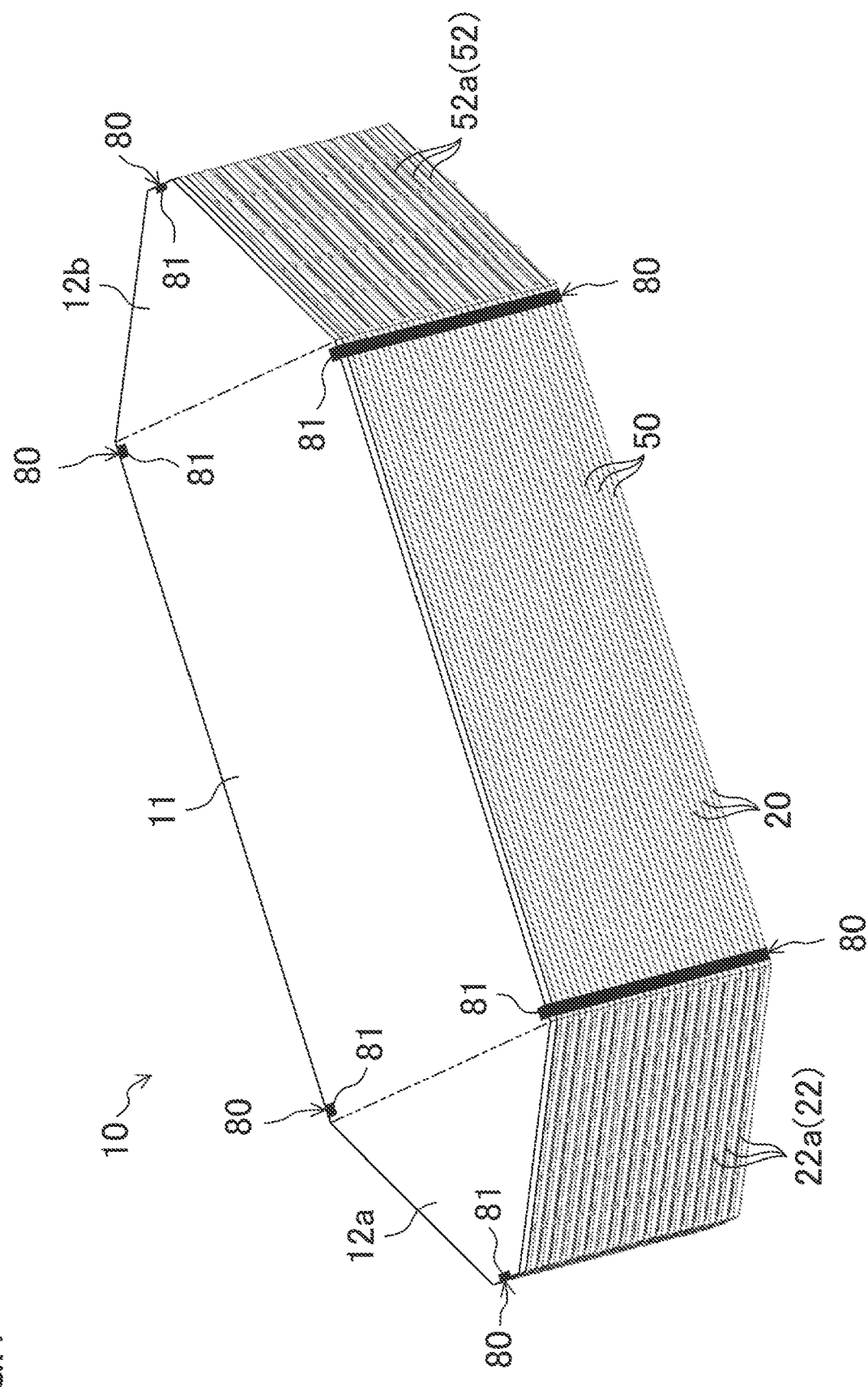
FIG. 1 is a perspective view of a heat exchanger according to an embodiment.

As illustrated in FIG. 1, the heat exchanger (10) is formed in a prism shape having polygonal end faces. Each end face of the heat exchanger (10) of the present embodiment has a horizontally oriented octagonal shape. As also illustrated in FIG. 2, the heat exchanger (10) includes a main heat exchange section (11) and two auxiliary heat exchange sections (12a, 12b).

Figure 2:
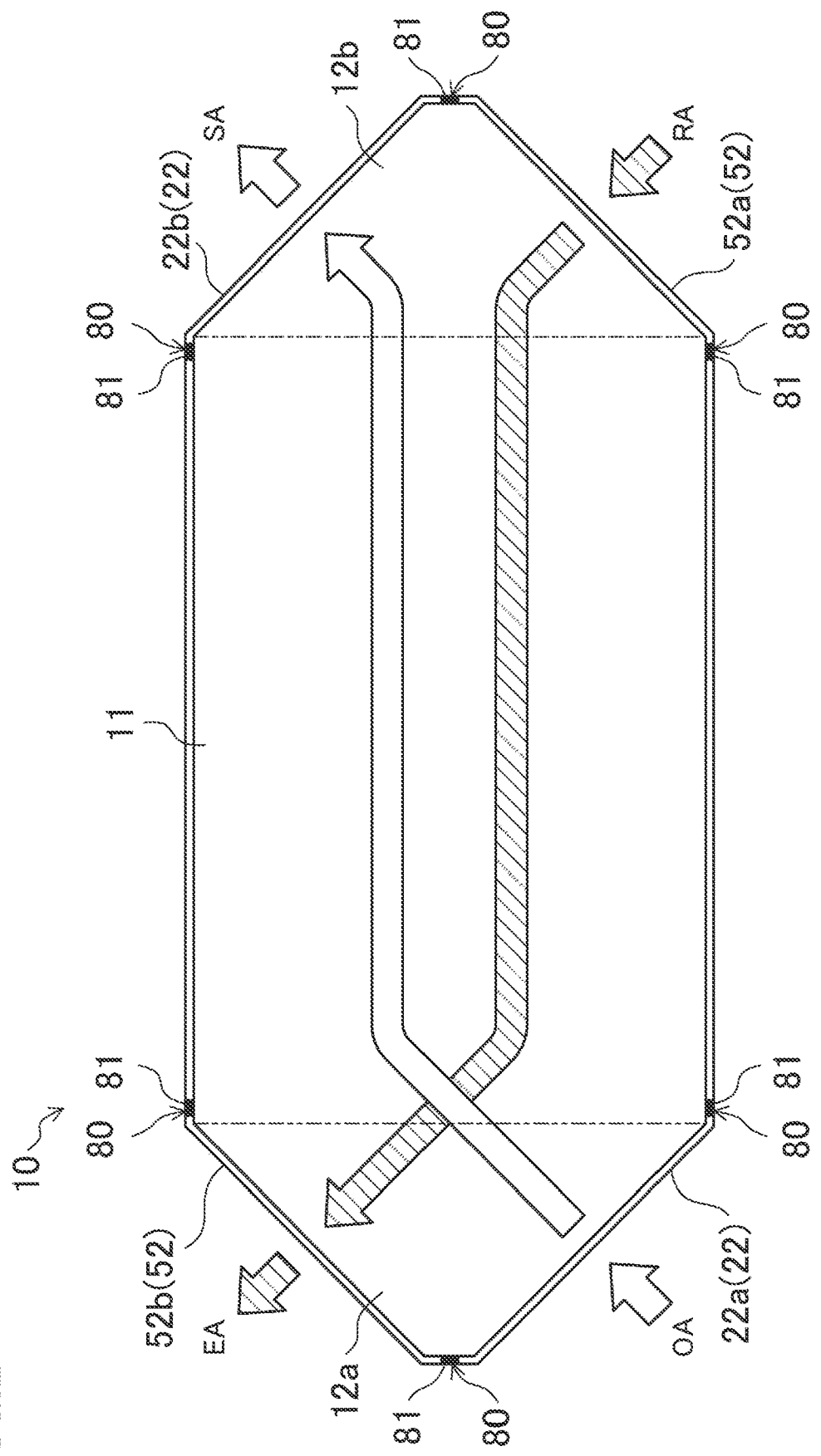
FIG. 2 is a plan view of the heat exchanger according to the embodiment.

The main heat exchange section (11) is located at the middle of the heat exchanger (10) in the right-to-left direction in FIG. 2. When the heat exchanger (10) is viewed in plan as illustrated in FIG. 2, the main heat exchange section (11) is a horizontally oriented rectangular portion. The auxiliary heat exchange sections (12a, 12b) are portions of the heat exchanger (10) located on the sides of the main heat exchange section (11) in the right-to-left direction in FIG. 2. In the heat exchanger (10), the auxiliary heat exchange sections (12a, 12b) are arranged on the respective sides of the main heat exchange section (11) in the right-to-left direction in FIG. 2. In the plan view of the heat exchanger (10) shown in FIG. 2, each of the auxiliary heat exchange section (12a, 12b) is a trapezoidal portion.

The heat exchanger (10) includes a plurality of first elements (20) and a plurality of second elements (50). The first elements (20) and the second elements (50) are alternately stacked in the heat exchanger (10). Each of the first elements (20) forms a first passage (21). The first passage (21) allows supply air to flow therethrough. Each of the second elements (50) forms a second passage (51). The second passage (51) allows exhaust air to flow therethrough. In the heat exchanger (10), the first passages (21) and the second passages (51) are alternately provided in the stacking direction of the first elements (20) and the second elements (50).

The heat exchanger (10) has a first inflow port (22a), a first outflow port (22b), a second inflow port (52a), and a second outflow port (52b) which are provided in side surfaces thereof (surfaces parallel to the stacking direction of the first elements (20) and the second elements (50)). The first inflow port (22a) and the first outflow port (22b) are provided in the first element (20) and communicate with the first passage (21). The second inflow port (52a) and the second outflow port (52b) are provided in the second element (50) and communicate with the second passage (51).

Figure 3:
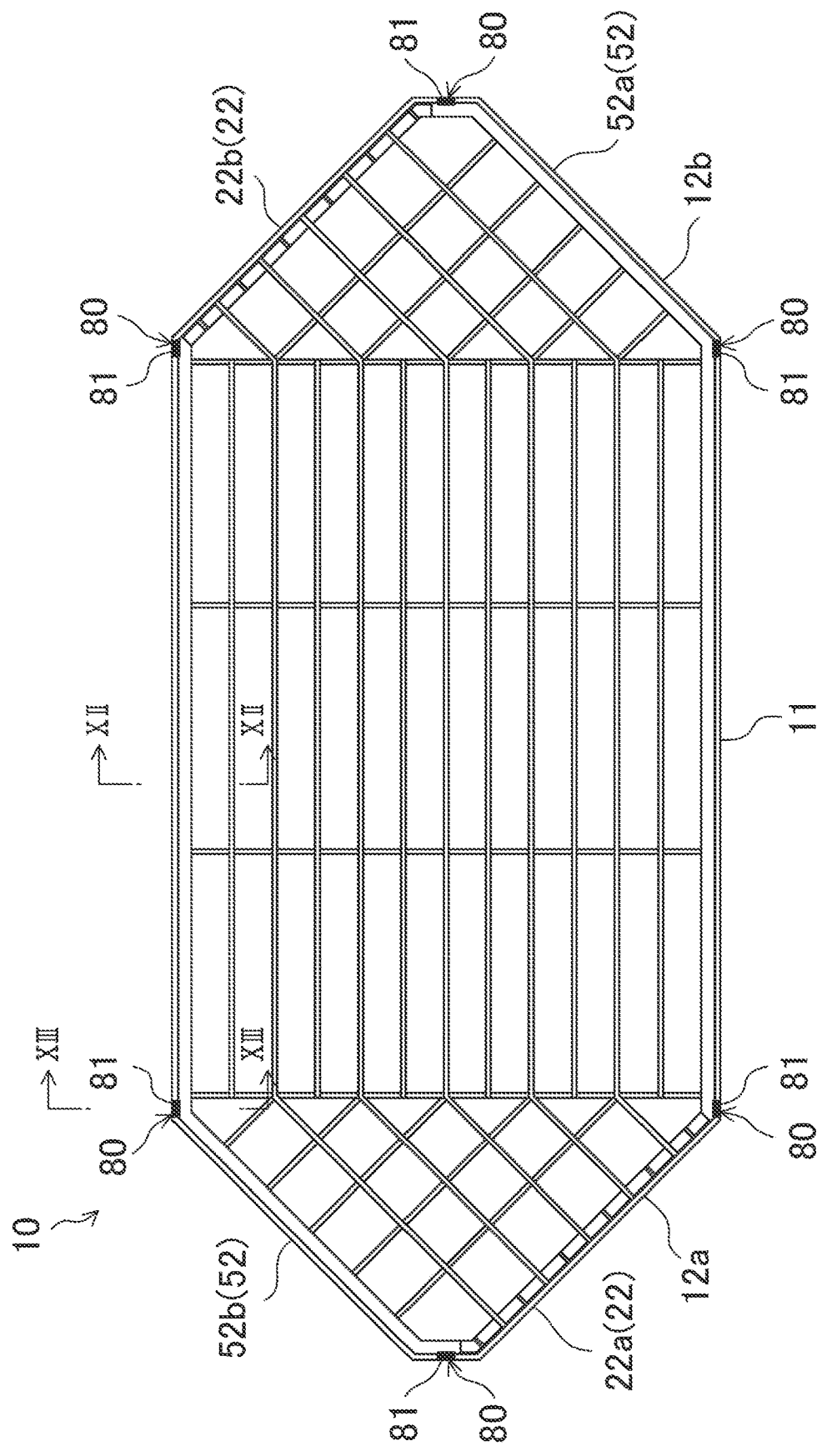
FIG. 3 is a plan view of partially extracted portion of the heat exchanger according to the embodiment.

As also illustrated in FIGS. 2 and 3, the first inflow port (22a), the first outflow port (22b), the second inflow port (52a), and the second outflow port (52b) are provided on different side surfaces of the heat exchanger (10). In one of the auxiliary heat exchange sections (12a) of the heat exchanger (10), the first inflow port (22a) is open on one side surface, and the second outflow port (52b) is open on a different side surface. In the other auxiliary heat exchange section (12b) of the heat exchanger (10), the first outflow port (22b) is open on one side surface, and the second inflow port (52a) is open on a different side surface.

The side surfaces of the heat exchanger (10) are formed by the outer peripheral surface of a stack of the first elements (20) and the second elements (50). The side surfaces of the heat exchanger (10) are substantially flat surfaces.

The first elements (20) and the second elements (50) constituting the heat exchanger (10) each have six notches (38, 68). In each of the elements (20, 50), the notches (38, 68) open on the outer peripheral surface of the element (20, 50).

The notches (38, 68) provided in one element (20, 50) correspond to the respective notches (38, 68) of each of the other elements (20, 50). In the heat exchanger (10), corresponding notches (38, 68) in the elements (20, 50) are aligned in a row in the stacking direction of the elements (20, 50). The corresponding notches (38, 68) in the elements (20, 50), aligned in a row, constitute notch rows (80).

As illustrated in FIGS. 1 to 3, the heat exchanger (10) of the present embodiment has six notch rows (80). In the side surfaces of the main heat exchange section (11), each of the side portions adjacent to one auxiliary heat exchange section (12a) and side portions adjacent to the other auxiliary heat exchange sections (12b) is provided with one notch row (80). In each of the auxiliary heat exchange sections (12a, 12b), the side surface located between the side surface where the first inflow port (22a) is open and the side surface where the second outflow port (52b) is open is provided with one notch row (80).

The heat exchanger (10) of the present embodiment is provided with a seal (81) so as to fill each notch row (80). As will be described later, the seal (81) is formed by filling the notch rows (80) with a filler such as a silicon sealing agent and solidifying the filler. The seal (81) covers substantially the entire surface of each of the notch rows (80).

Flow of Air and Heat Exchange Action

As illustrated in FIG. 2, into the heat exchanger (10), outdoor air OA flows through the first inflow port (22a), and room air RA flows through the second inflow port (52a). The outdoor air OA that has entered the first inflow port (22a) goes through the first passage (21) as the supply air, passes through the one auxiliary heat exchange section (12a), the main heat exchange section (11), and the other auxiliary heat exchange section (12b) in this order, and is supplied into the room through the first outflow port (22b). The room air RA that has entered the second inflow port (52a) goes through the second passage (51) as the exhaust air, passes through the other auxiliary heat exchange section (12b), the main heat exchange section (11), and the one auxiliary heat exchange section (12a) in this order, and is discharged to the outside of the room through the second outflow port (52b).

In each of the auxiliary heat exchange sections (12a, 12b) of the heat exchanger (10), the supply air in the first passage (21) and the exhaust air in the second passage (51) flow in directions intersecting with each other. In the main heat exchange section (11) of the heat exchanger (10), the supply air in the first passage (21) and the exhaust air in the second passage (51) flow in opposite directions.

The heat exchanger (10) causes the supply air flowing through the first passage (21) and the exhaust air flowing through the second passage (51) to exchange sensible heat and latent heat (moisture). Of the supply air and the exhaust air in the heat exchanger (10), one with the higher temperature transfers heat to the other with the lower temperature. Further, of the supply air and the exhaust air in the heat exchanger (10), one with the higher humidity transfers moisture to the other with the lower humidity.

First Element, Second Element

Figure 12:
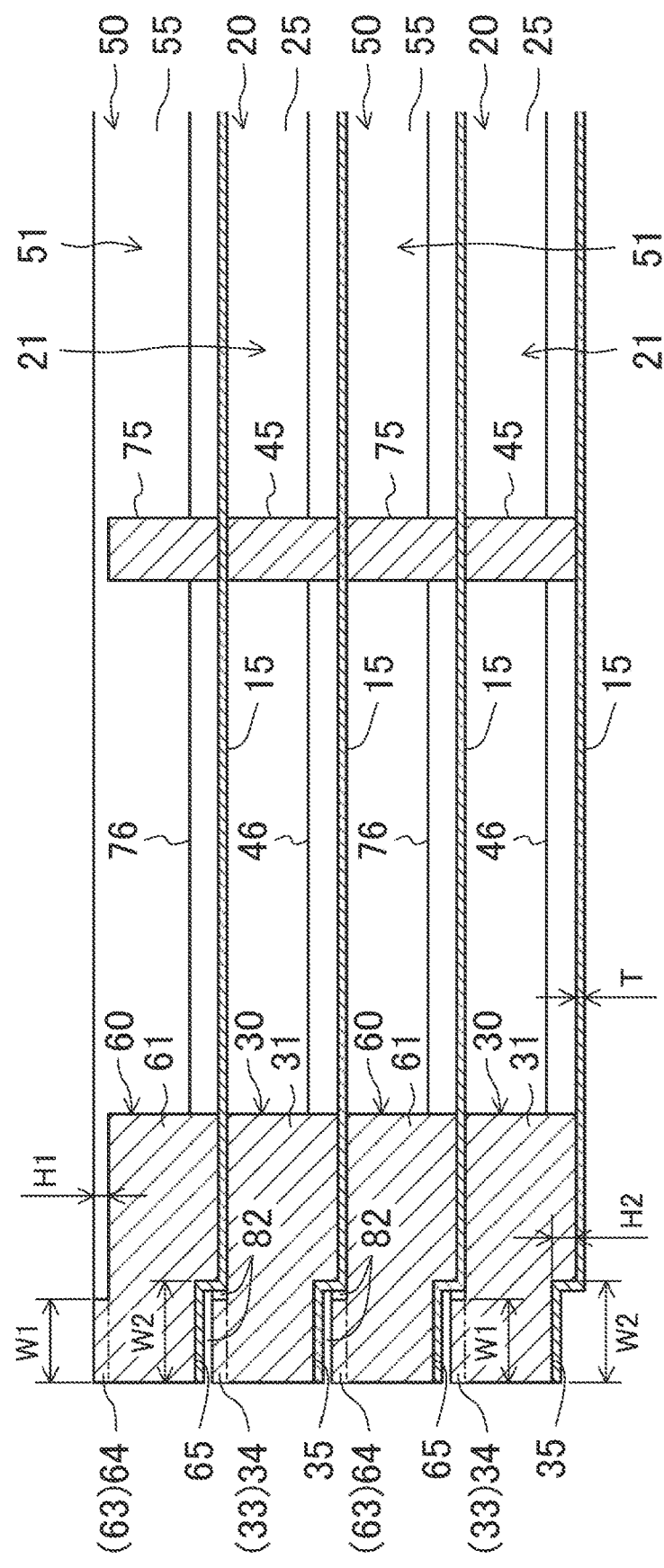
FIG. 12 is a cross-sectional view of portion of the heat exchanger taken along line XII-XII in FIG. 3.
Figure 13:
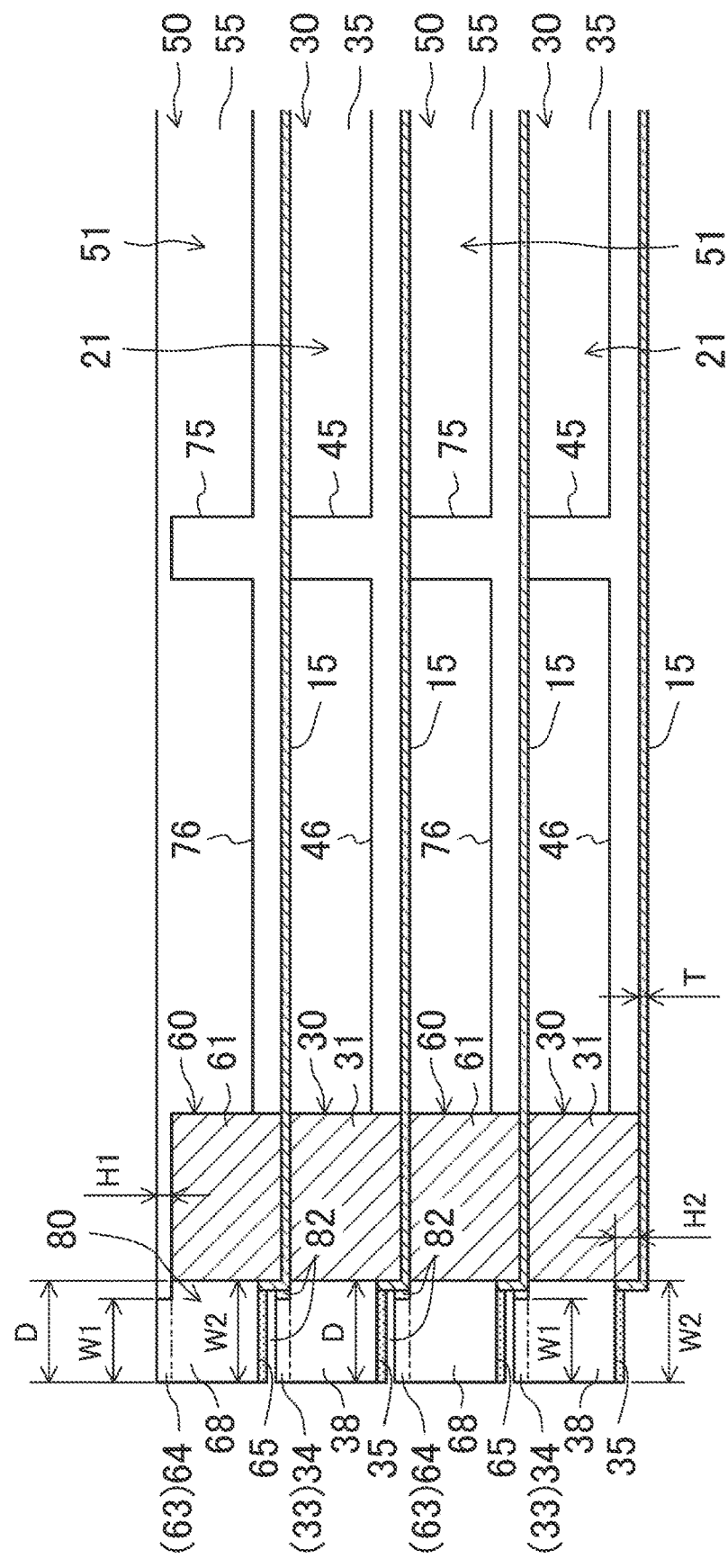
FIG. 13 is a cross-sectional view of portion of the heat exchanger taken along line XIII-XIII in FIG. 3.

As illustrated in FIGS. 12 and 13, the first element (20) includes a first frame (25) and a partition sheet (15), and the second element (50) includes a second frame (55) and a partition sheet (15).

Each of the first frame (25) and the second frame (55) is a flat, injection-molded resin member. In the following description, the upper surfaces of the first frame (25) and the second frame (55) in FIGS. 12 and 13 will be referred to as "front surfaces," and the lower surfaces of the first frame (25) and the second frame (55) in FIGS. 12 and 13 will be referred to as "back surfaces."

The partition sheet (15) is a sheet-like member having high moisture permeability and low air permeability. The partition sheet (15) is a partition member separating between the first passage (21) and the second passage (51). The partition sheet (15) is made of a polymer material (e.g., polyurethane) containing a hydrophilic group and a hydrophobic group. The partition sheet (15) has a thickness of, e.g., about 1 µm to 30 µm.

The partition sheet (15) may be made of paper or nonwoven fabric. Examples of the material of the paper or nonwoven fabric used as the partition sheet (15) include fibrous resin, fibrous metal, glass fiber, and pulp.

The first element (20) includes the partition sheet (15) bonded to a back surface of the first frame (25) with an adhesive. The partition sheet (15) covers substantially the entire back surface of the first frame (25). The second element (50) includes the partition sheet (15) bonded to a back surface of the second frame (55) with an adhesive. The partition sheet (15) covers substantially the entire back surface of the second frame (55).

First Frame

Figure 4:
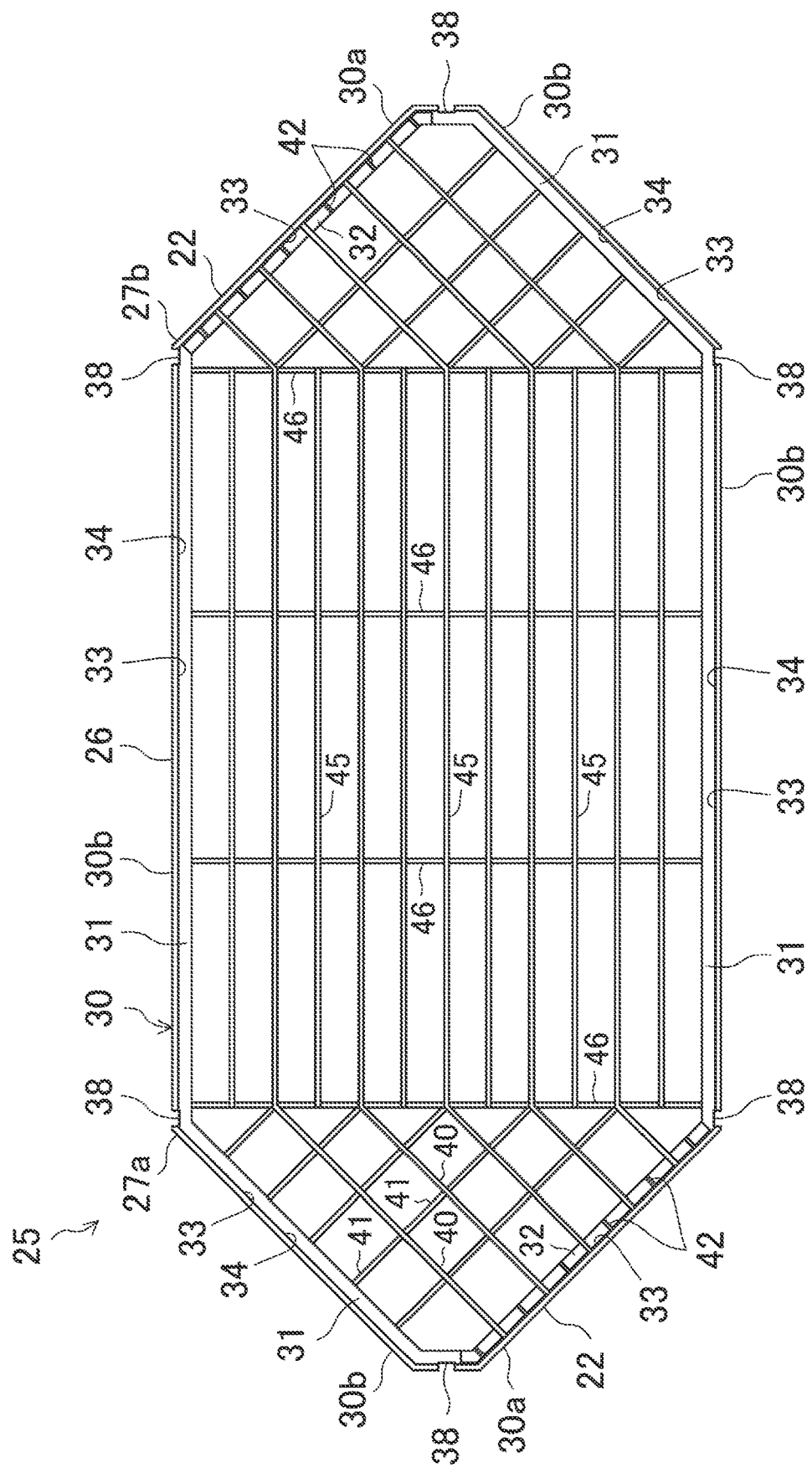
FIG. 4 is a plan view of a first frame according to the embodiment.

As illustrated in FIG. 4, the first frame (25) is formed in a horizontally oriented octagonal shape in plan view. The first frame (25) has substantially the same outer shape as the end faces of the heat exchanger (10) in plan view. The first frame (25) is a first spacing member that keeps a space between an adjacent pair of the partition sheets (15).

The first frame (25) has a single middle area (26) and two end areas (27a, 27b). The middle area (26) is a horizontally oriented rectangular area, and is located at the middle in the right-to-left direction in FIG. 4. The first frame (25) has the end areas (27a, 27b) provided on both sides of the middle area (26). The end areas (27a, 27b) are trapezoidal areas located on the sides of the middle area (26) in the right-to-left direction in FIG. 4.

Frame Portion

The first frame (25) includes a frame portion (30). The frame portion (30) is a portion extending along the outer periphery of the first frame (25) over the entire perimeter of the first frame (25). In other words, the frame portion (30) is formed in a horizontally oriented octagonal frame shape. The frame portion (30) surrounds the periphery of the first passage (21) formed by the first frame (25). The frame portion (30) extends along the periphery of the partition sheet (15).

The frame portion (30) of the first frame (25) has two first communication openings (22). The frame portion (30) of the first frame (25) is divided into a first communication section (30a) provided with the first communication opening (22) and a first partition wall (30b) separating the first passage (21) from the outside of the frame portion (30). The first partition wall (30b) is a portion of the frame portion (30) where no first communication openings (22) are formed.

Each first communication opening (22) provided in each frame portion (30) allows the first passage (21) surrounded by the frame portion (30) to communicate with the outside of the frame portion (30). In the frame portion (30) shown in FIG. 4, one of the first communication openings (22) is provided over substantially the entire downward oblique side of the left end area (27a) and a lower portion of the short side located at the left end of the end area (27a), and constitutes the first inflow port (22a). Also in the frame portion (30) shown in FIG. 4, the other first communication opening (22) is provided over substantially the entire upward oblique side of the right end area (27b) and an upper portion of the shirt side located at the right end of the end area (27b), and constitutes the first outflow port (22b).

Figure 5:
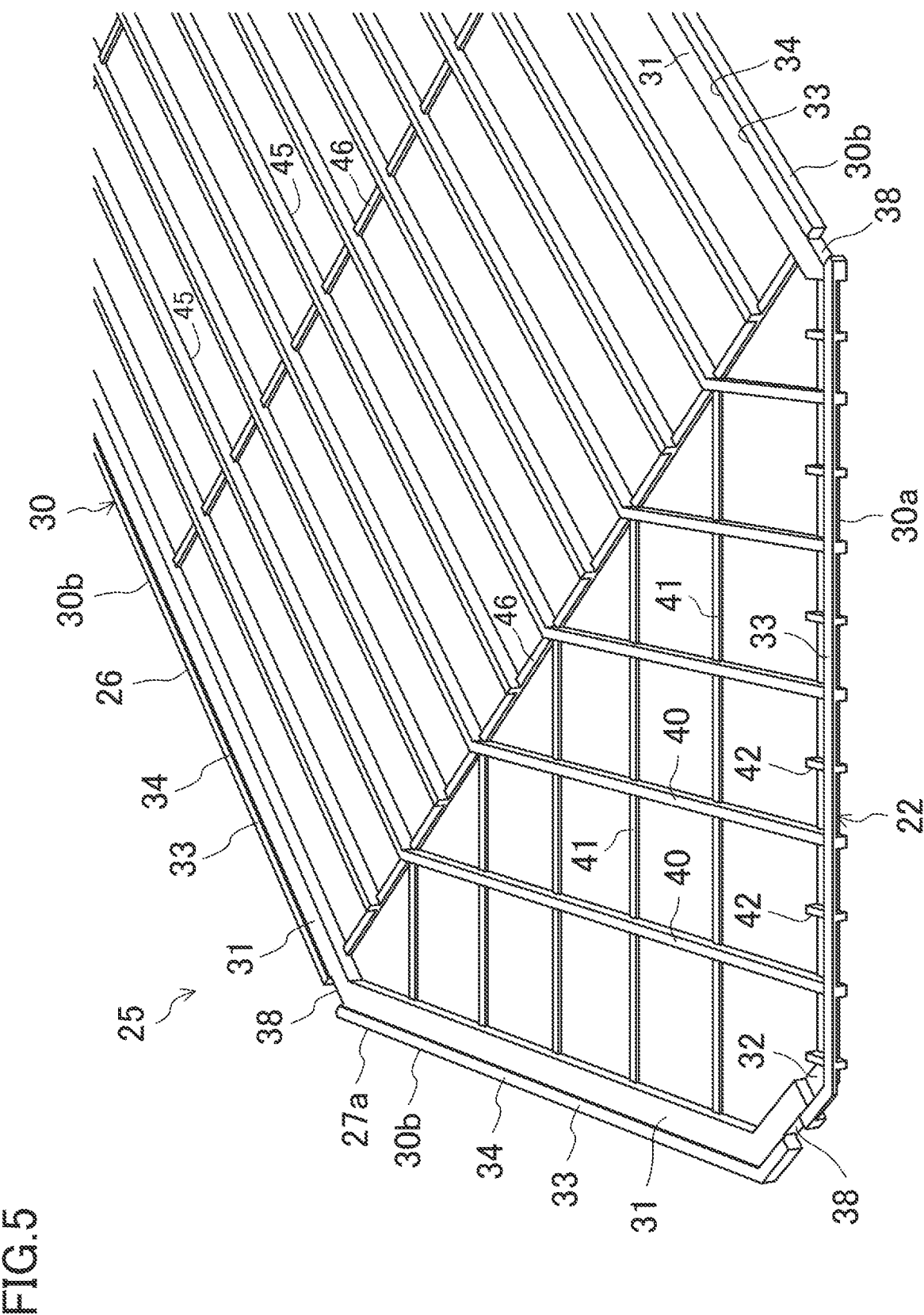
FIG. 5 is a perspective view of portion of the first frame according to the embodiment as viewed from the front side.
Figure 6:
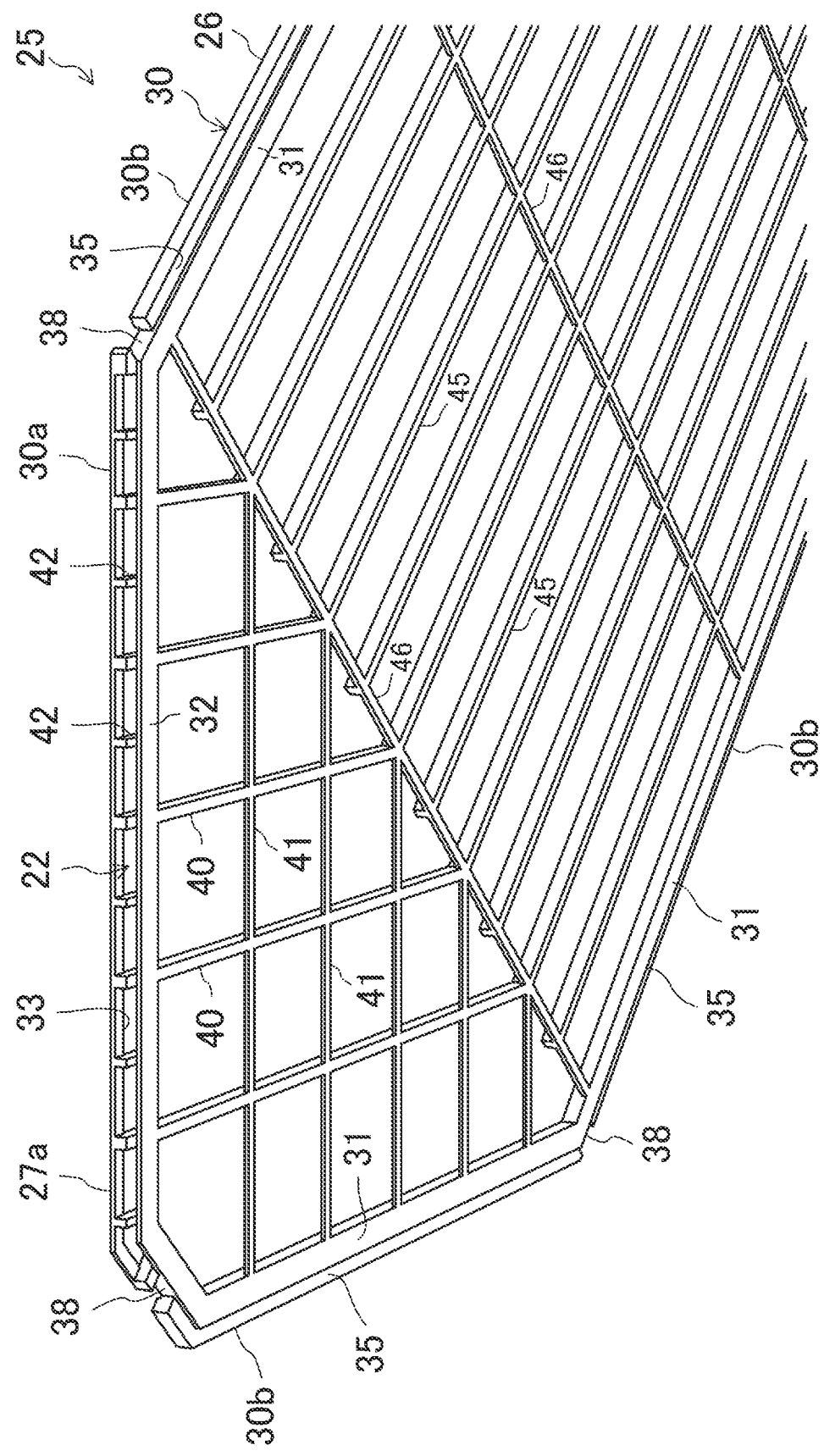
FIG. 6 is a perspective view of portion of the first frame according to the embodiment as viewed from the back side.

As illustrated in FIGS. 4 to 6, the frame portion (30) of the first frame (25) includes a blocking portion (31), an outer rib (33), and an auxiliary rib (32). A portion of the outer rib (33) constitutes a ridge (34). An elongated recess (35) is provided in the blocking portion (31).

The blocking portion (31) constitutes a first partition wall (30b) of the frame portion (30). When viewed in section as illustrated in FIGS. 12 and 13, the blocking portion (31) is in the shape of a rectangle one corner of which is cut off. The blocking portion (31) separates the first passage (21) surrounded by the frame portion (30) from the outside of the frame portion (30). The thickness of the blocking portion (31) is substantially equal to the thickness of the first passage (21).

As illustrated in FIG. 4, the outer rib (33) is a portion extending along the outer periphery of the frame portion (30) over the entire perimeter of the frame portion (30). The outer rib (33) is provided along all the eight sides of the frame portion (30). The outer rib (33) is arranged on the front surface of the blocking portion (31) and integral with the blocking portion (31).

As illustrated in FIGS. 12 and 13, a portion of the outer rib (33) adjacent to the blocking portion (31) serves as the ridge (34). The ridge (34) extends along the outermost peripheral edge of the blocking portion (31) and protrudes from the front surface of the blocking portion (31). The outer peripheral surface of the ridge (34) forms a plane together with the outer peripheral surface of the blocking portion (31). The ridge (34) constitutes the first partition wall (30b) together with the blocking portion (31).

As illustrated in FIGS. 12 and 13, the elongated recess (35) is a recessed groove that is open on the back surface of the blocking portion (31). The elongated recess (35) is provided along the outermost peripheral edge of the blocking portion (31) over the entire length of the blocking portion (31). The elongated recess (35) is also open on the outer peripheral surface of the blocking portion (31). The cross-sectional shape of the elongated recess (35) corresponds to the cross-sectional shape of a ridge (64), which will be described later, of the second frame (55). The outer rib (63) of the second frame (55) fits into the elongated recess (35) of the first frame (25). Thus, the ridge (64), which is a portion of the outer rib (63) of the second frame (55), fits into the elongated recess (35) of the first frame (25).

As illustrated in FIGS. 4 to 6, the auxiliary rib (32) extends along each of the first communication openings (22). The auxiliary rib (32) is arranged on the back side of the frame portion (30). The auxiliary rib (32) has a flat rectangular cross section. The front surface of the auxiliary rib (32) is flush with a tip end face of the ridge (64) of the adjacent second frame (55). The back surface of the auxiliary rib (32) is flush with the back surface of the blocking portion (31).

As illustrated in FIG. 4, the frame portion (30) of the first frame (25) has six first notches (38). Each of the first notches (38) is provided in the first partition wall (30b) of the frame portion (30). In the frame portion (30), both ends of each of the first communication sections (30a) are each provided with a first notch (38).

Four first notches (38) are provided in the middle area (26) of the first frame (25). A left end (a boundary portion with the end area (27a)) and a right end (a boundary portion with the end area (27b)) of a portion of the frame portion

(30) extending in the longitudinal direction of the middle area (26) in FIG. 4 are each provided with a first notch (38).

The end areas (27a, 27b) of the first frame (25) are each provided with a first notch (38). In the frame portion (30), a short side portion at the left end in FIG. 4 is provided with a first notch (38), and a short side portion at the right end in FIG. 4 is provided with a first notch (38).

Figure 7:
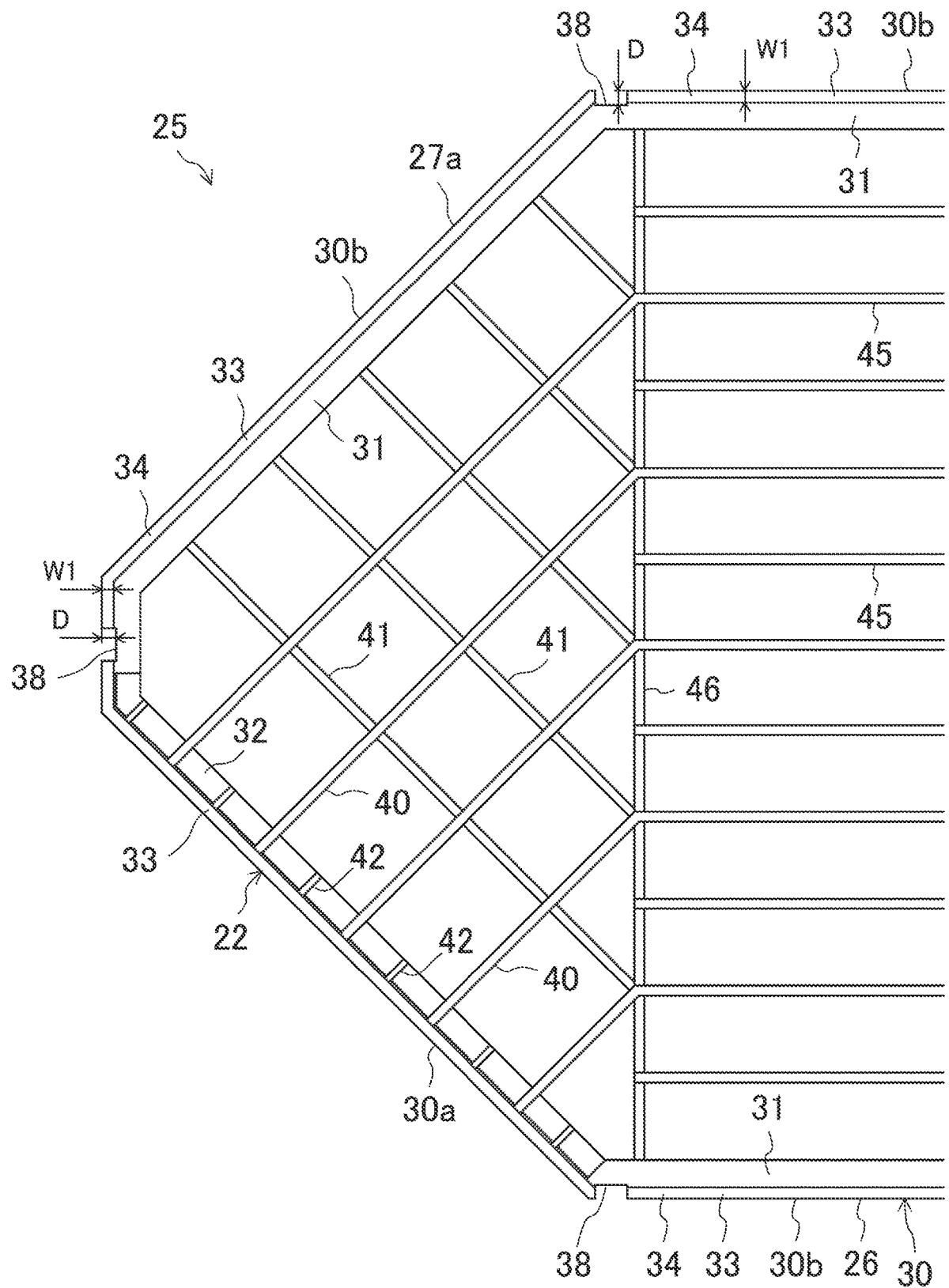
FIG. 7 is a plan view of portion of the first frame according to the embodiment.
Figure 8:
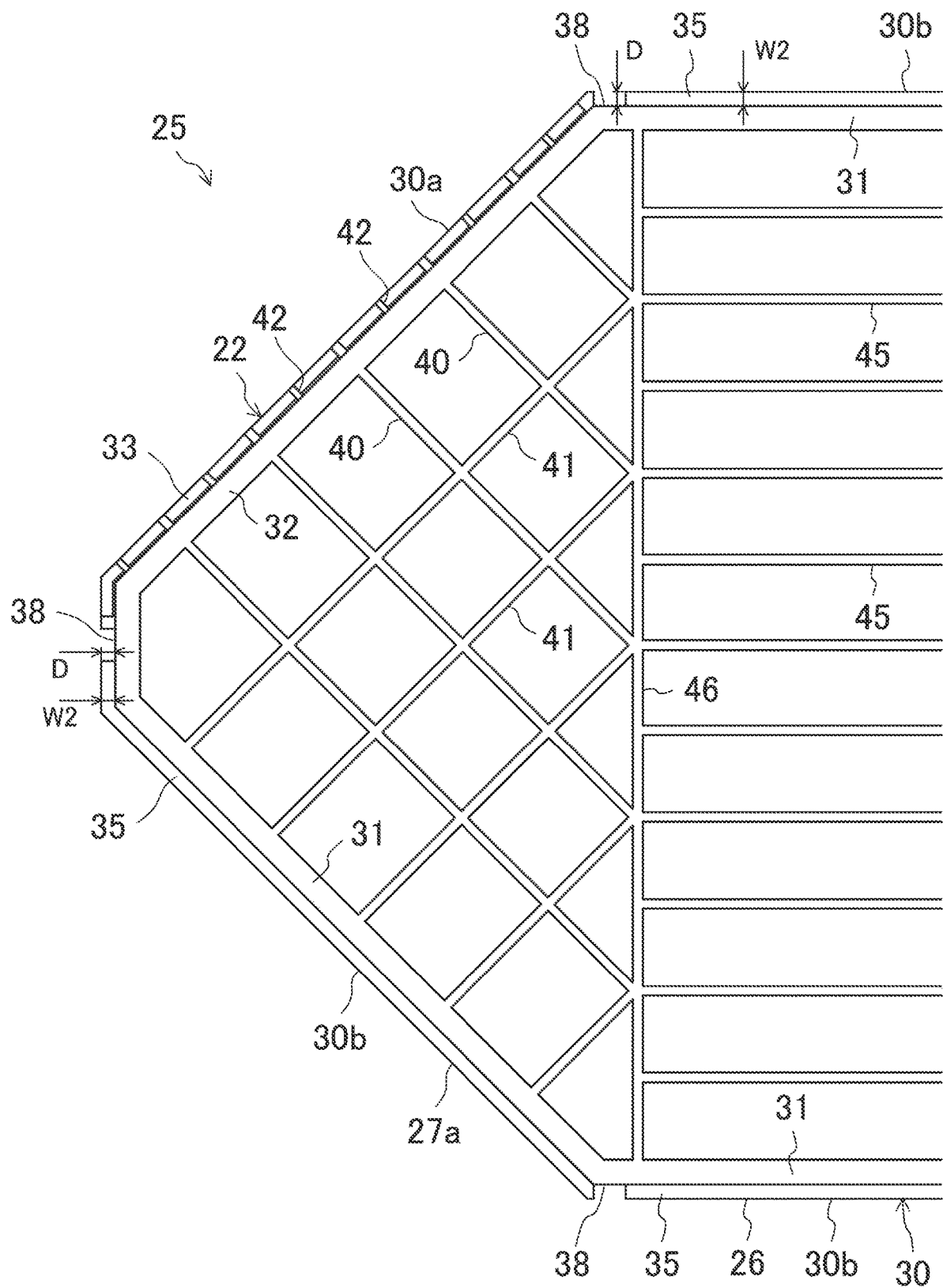
FIG. 8 is a bottom view of portion of the first frame according to the embodiment.

As illustrated in FIGS. 7 and 8, each of the first notches (38) is open on the outer peripheral surface of the frame portion (30), and extending toward inside of the frame portion (30). The first notch (38) has a rectangular shape in plan view. The depth D of the first notch (38) is shorter than the width (space between the inner and outer surfaces) of the frame portion (30). The depth D of the first notch (38) is greater than the width W1 of the ridge (34), and substantially equal to the width W2 of the elongated recess (35).

First Inner Rib, First Holding Rib, First Support

As illustrated in FIGS. 4 to 6, the first frame (25) includes first inner ribs (40), first holding ribs (41), and first supports (42). The first inner ribs (40), the first holding ribs (41), and the first supports (42) are provided in each end area (27a, 27b) of the first frame (25).

Each of the first inner ribs (40) is formed in a straight bar shape, and extends in a direction intersecting with the first communication opening (22). In the present embodiment, the first inner ribs (40) are integral with the outer rib (33) and the auxiliary rib (32) extending along the first communication openings (22). The height of the first inner ribs (40) is substantially equal to the thickness of the first passage (21). In each of the end areas (27a, 27b) of the first frame (25) of the present embodiment, five first inner ribs (40) are arranged in parallel to each other at substantially regular intervals.

Each of the first holding ribs (41) is formed in a straight bar shape, and extends in a direction substantially orthogonal to the first inner ribs (40). Each of the first holding ribs (41) extends from one of an adjacent pair of the first inner ribs (40) to the other. In other words, each of the first holding ribs (41) extends across the first passage (21) between an adjacent pair of the first inner ribs (40). Each of the first holding ribs (41) is less than half as thick as the first inner ribs (40).

The first support (42) is a plate-shaped portion extending in the width direction of the auxiliary rib (32) of the frame portion (30). The first support (42) connects between the outer rib (33) and the auxiliary rib (32). Each of the first supports (42) is provided between an adjacent pair of the first inner ribs (40) in the longitudinal direction of the auxiliary rib (32).

Intra-First Passage Rib, First Support Rib

As illustrated in FIGS. 4 to 6, the first frame (25) includes intra-first passage ribs (45) and first support ribs (46). The intra-first passage ribs (45) and the first support ribs (46) are provided in the middle area (26) of the first frame (25).

Each of the intra-first passage ribs (45) is formed in a straight bar shape, and extends in a direction parallel to the long side of the middle area (26). In other words, the intra-first passage ribs (45) extend from one end area (27a) toward the other end area (27b). The height of the intra-first passage ribs (45) is substantially equal to the thickness of the first passage (21) (see FIG. 12). In the middle area (26) of the first frame (25) of the present embodiment, eleven intra-first passage ribs (45) are arranged in parallel to each other at substantially regular intervals.

Each of the first support ribs (46) is formed in a straight bar shape, and extends in a direction substantially orthogonal to the intra-first passage ribs (45). Each of the first support ribs (46) is provided to extend from one of an adjacent pair of the intra-first passage ribs (45) to the other. In other words, each of the first support ribs (46) extends across the first passage (21) between an adjacent pair of the intra-first passage ribs (45). The first support ribs (46) are integral with the intra-first passage ribs (45), and keep a space between an adjacent pair of the intra-first passage ribs (45).

Second Frame

As illustrated in FIG. 8, the second frame (55) is formed in a horizontally oriented octagonal shape in plan view. The second frame (55) has substantially the same outer shape as the end faces of the heat exchanger (10) in plan view. The second frame (55) is a second spacing member that keeps a space between an adjacent pair of the partition sheets (15).

The second frame (55) has a single middle area (56) and two end areas (57a, 57b). The middle area (56) is a horizontally oriented rectangular area, and is located at the middle in the right-to-left direction in FIG. 9. In the second frame (55), the end areas (57a, 57b) are provided on both sides of the middle area (56). The end areas (57a, 57b) are trapezoidal areas located on the sides of the middle area (56) in the right-to-left direction in FIG. 9.

Frame Portion

The second frame (55) includes a frame portion (60). The frame portion (60) is a portion extending along the outer periphery of the second frame (55) over the entire perimeter of the second frame (55). In other words, the frame portion (60) is formed in a horizontally oriented octagonal frame shape. The frame portion (60) surrounds the periphery of the second passage (51) formed of the second frame (55). The frame portion (60) extends along the periphery of the partition sheet (15).

The frame portion (60) of the second frame (55) has two second communication openings (52). The frame portion (60) of the second frame (55) is divided into a second communication section (60a) provided with the second communication openings (52) and a second partition wall (60b) separating the second passage (51) from the outside of the frame portion (60). The second partition wall (60b) is a portion of the frame portion (60) where no second communication openings (52) are formed.

Each second communication opening (52) provided in each frame portion (60) allows the second passage (51) surrounded by the frame portion (60) to communicate with the outside of the frame portion (60). In the frame portion (60) shown in FIG. 9, one of the second communication openings (52) is provided over substantially the entire upward oblique side of the left end area (57a) and an upper portion of the short side located at the left end of the end area (57a), and constitutes the second outflow port (52b). Also in the frame portion (60) shown in FIG. 9, the other second communication opening (52) is provided over substantially the entire downward oblique side of the right end area (57b) and a lower portion of the short side located at the right end of the end area (57b), and constitutes the second inflow port (52a).

Figure 9:
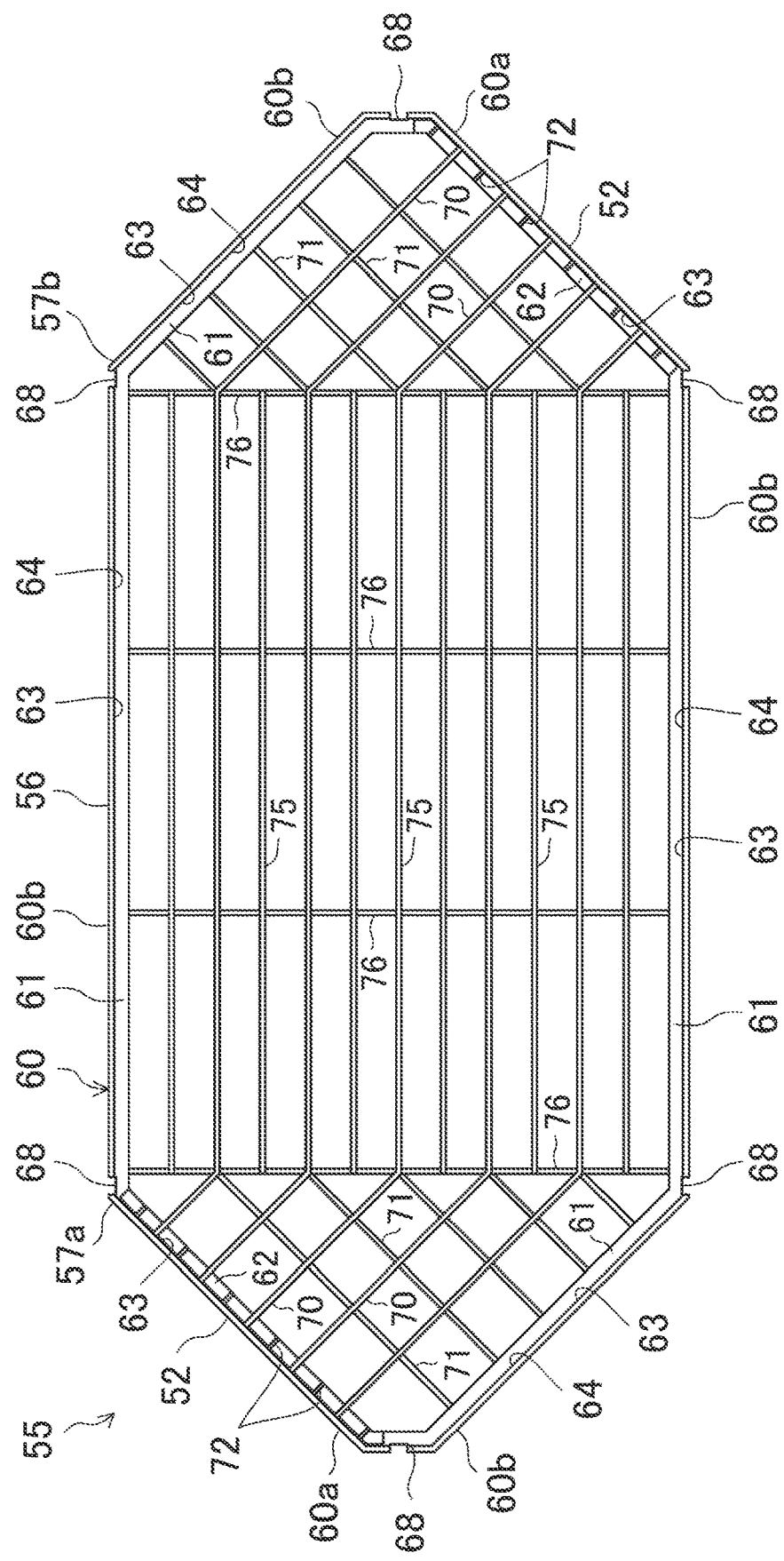
FIG. 9 is a plan view of a second frame of the embodiment.
Figure 10:
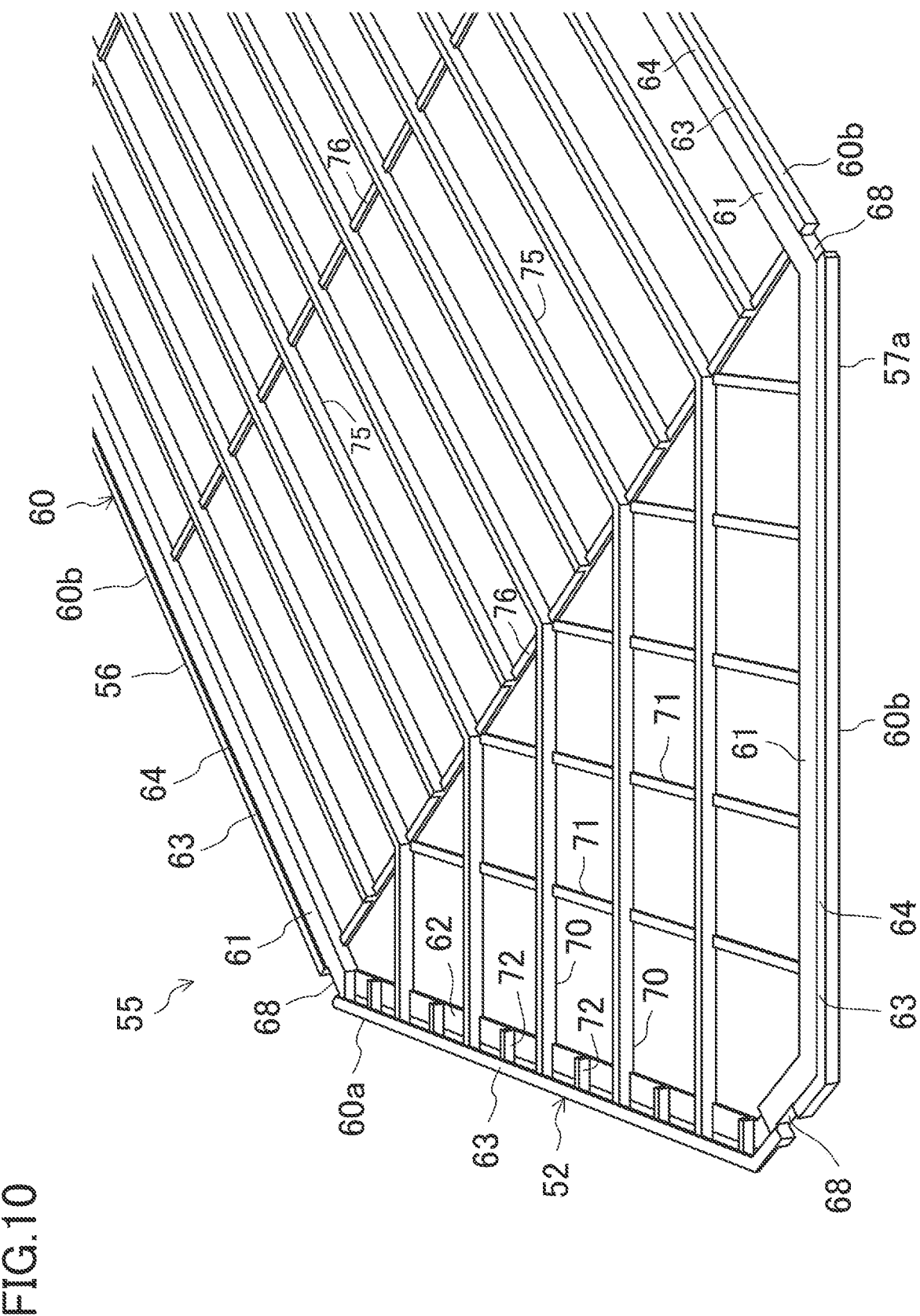
FIG. 10 is a perspective view of portion of the second frame of the embodiment as viewed from the front side.
Figure 11:
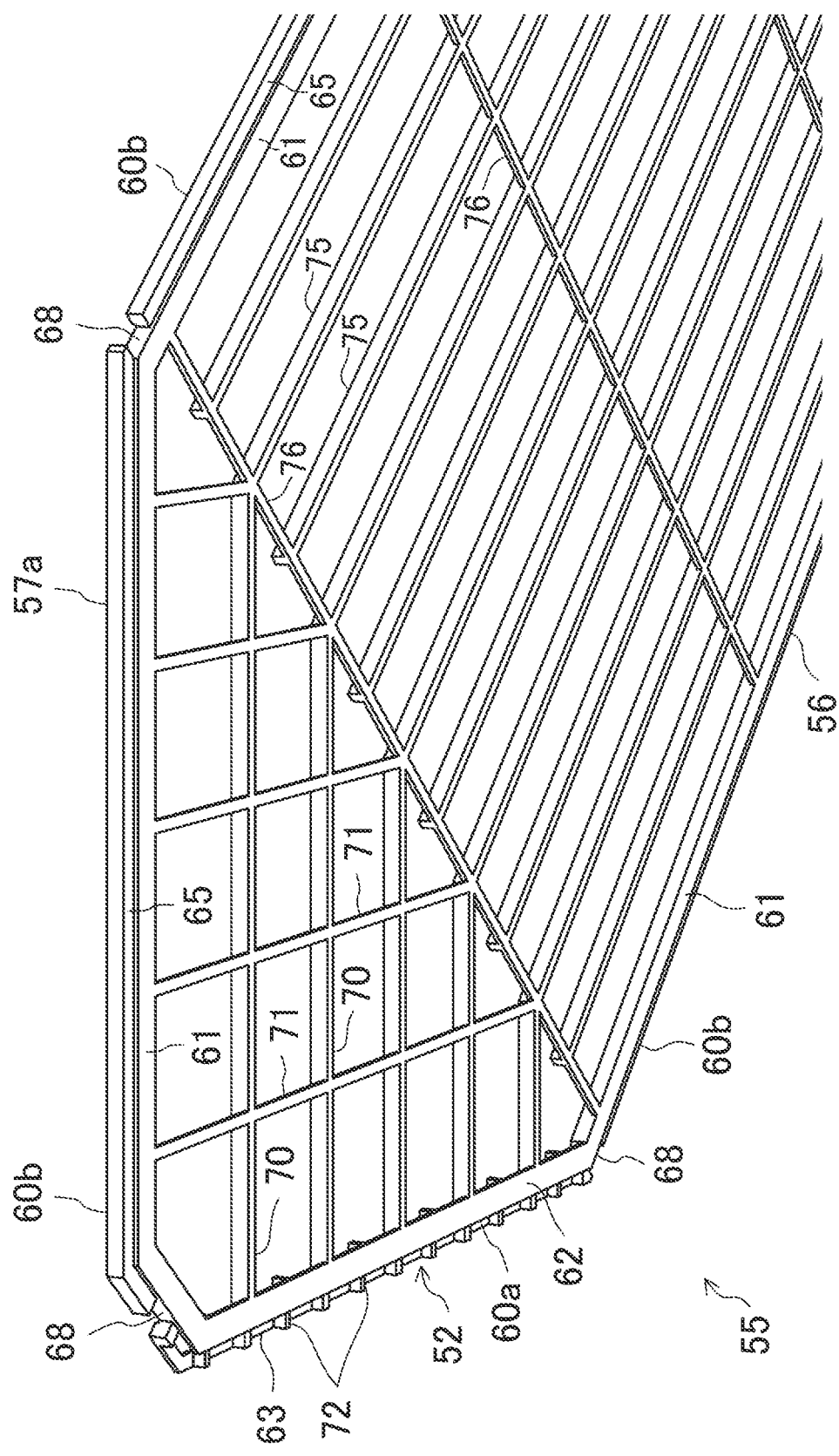
FIG. 11 is a perspective view of portion of the second frame of the embodiment as viewed from the back side.

As illustrated in FIGS. 9 to 11, the frame portion (60) of the second frame (55) includes a blocking portion (61), an outer rib (63), and an auxiliary rib (62). A portion of the outer rib (63) constitutes a ridge (64). An elongated recess (65) is provided in the blocking portion (61).

The blocking portion (61) constitutes a second partition wall (60b) of the frame portion (60). When viewed in section as illustrated in FIGS. 12 and 13, the blocking portion (61) is in the shape of a rectangle one corner of which is cut off. The blocking portion (61) separates the second passage (51) surrounded by the frame portion (60) from the outside of the frame portion (60). The thickness of the blocking portion (61) is substantially equal to the thickness of the second passage (51).

As illustrated in FIG. 9, the outer rib (63) is a portion extending along the outer periphery of the frame portion (60) over the entire perimeter of the frame portion (60). The outer rib (63) is provided along all the eight sides of the frame portion (60). The outer rib (63) is arranged on the front surface of the blocking portion (61) and integral with the blocking portion (61).

As illustrated in FIGS. 12 and 13, a portion of the outer rib (63) adjacent to the blocking portion (61) serves as the ridge (64). The ridge (64) extends along the outermost peripheral edge of the blocking portion (61) and protrudes from the front surface of the blocking portion (61). The outer peripheral surface of the ridge (64) forms a plane together with the outer peripheral surface of the blocking portion (61). The ridge (64) constitutes the second partition wall (60b) together with the blocking portion (61).

As illustrated in FIGS. 12 and 13, the elongated recess (65) is a recessed groove that is open on the back surface of the blocking portion (61). The elongated recess (65) is provided along the outermost peripheral edge of the blocking portion (61) over the entire length of the blocking portion (61). The elongated recess (65) also opens on the outer peripheral surface of the blocking portion (61). The cross-sectional shape of the elongated recess (65) corresponds to the cross-sectional shape of the ridge (34) of the first frame (25). The outer rib (33) of the first frame (25) fits into the elongated recess (65) of the second frame (55). Thus, the ridge (34), which is a portion of the outer rib (33) of the first frame (25), fits into the elongated recess (65) of the second frame (55).

As illustrated in FIGS. 9 to 11, the auxiliary rib (62) extends along each of the second communication openings (52). The auxiliary rib (62) is arranged on the back side of the frame portion (60). The auxiliary rib (62) has a flat rectangular cross section. The front surface of the auxiliary rib (62) is flush with a tip end face of the ridge (34) of the adjacent first frame (25). The back surface of the auxiliary rib (62) is flush with the back surface of the blocking portion (61).

As illustrated in FIG. 9, the frame portion (60) of the second frame (55) has six second notches (68). Each of the second notches (68) is provided in the second partition wall (60b) of the frame portion (60). In the frame portion (60), both ends of each of the second communication sections (60a) are each provided with a second notch (68).

Four second notches (68) are provided in the middle area (56) of the second frame (55). A left end (a boundary portion with the end area (57a)) and a left end (a boundary portion with the end area (57b)) of a portion of the frame portion (60) extending in the longitudinal direction of the middle area (56) in FIG. 9 are each provided with a second notch (68).

The end areas (57a, 57b) of the second frame (55) are each provided with a second notch (68). In the frame portion (60), a short side portion at the left end in FIG. 9 is provided with a second notch (68), and a short side portion at the right end in FIG. 9 is provided with a second notch (68).

The second notch (68) has the same shape as the first notch (38). Specifically, each of the second notches (68) is open on the outer peripheral surface of the frame portion (60), and extending toward inside of the frame portion (60). The second notch (68) has a rectangular shape in plan view. The depth D of the second notch (68) is shorter than the width (space between the inner and outer surfaces) of the frame portion (60). The depth D of the second notch (68) is greater than the width W1 of the ridge (64), and substantially equal to the width W2 of the elongated recess (65).

Second Inner Rib, Second Holding Rib, Second Support

As illustrated in FIGS. 9 to 11, the second frame (55) includes second inner ribs (70), second holding ribs (71), and second supports (72). The second inner ribs (70), the second holding ribs (71), and the second supports (72) are provided in each end area (57a, 57b) of the second frame (55).

Each of the second inner ribs (70) is formed in a straight bar shape, and extends in a direction intersecting with the second communication opening (52). In the present embodiment, the second inner ribs (70) are integral with the outer rib (63) and the auxiliary rib (62) extending along the second communication openings (52). The height of the second inner ribs (70) is substantially equal to the thickness of the second passage (51). In each of the end areas (57a, 57b) of the second frame (55) of the present embodiment, five second inner ribs (70) are arranged in parallel to each other at substantially regular intervals.

Each of the second holding ribs (71) is formed in a straight bar shape, and extends in a direction substantially orthogonal to the second inner ribs (70). Each of the second holding ribs (71) is provided to extend from one of an adjacent pair of the second inner ribs (70) to the other. In other words, each of the second holding ribs (71) extends across the second passage (51) between an adjacent pair of the second inner ribs (70). Each of the second holding ribs (71) is less than half as thick as the second inner ribs (70).

The second support (72) is a plate-shaped portion extending in the width direction of the auxiliary rib (62) of the frame portion (60). The second support (72) connects between the outer rib (63) and the auxiliary rib (62). Each of the second supports (72) is provided between an adjacent pair of the second inner ribs (70) in the longitudinal direction of the auxiliary rib (62).

Intra-Second Passage Rib, Second Support Rib

As illustrated in FIGS. 9 to 11, the second frame (55) includes intra-second passage ribs (75) and second support ribs (76). The intra-second passage ribs (75) and the second support ribs (76) are provided in the middle area (56) of the second frame (55).

Each of the intra-second passage ribs (75) is formed in a straight bar shape, and extends in a direction parallel to the long side of the middle area (56). In other words, the intra-second passage ribs (75) extend from one end area (57a) toward the other end area (57b). The height of the intra-second passage ribs (75) is substantially equal to the thickness of the second passage (51) (see FIG. 12). In the middle area (56) of the second frame (55) of the present embodiment, eleven intra-second passage ribs (75) are arranged in parallel to each other at substantially regular intervals.

Each of the second support ribs (76) is formed in a straight bar shape, and extends in a direction substantially orthogonal to the intra-second passage ribs (75). Each of the second support ribs (76) is provided to extend from one of an adjacent pair of the intra-second passage ribs (75) to the other. In other words, each of the second support ribs (76) extends across the second passage (51) between an adjacent pair of the intra-second passage ribs (75). The second support ribs (76) are integral with the intra-second passage ribs (75), and keep a space between the adjacent pair of the intra-second passage ribs (75).

Multilayer Structure of First Elements and Second Elements

A multiplayer structure of the first elements (20) and the second elements (50) will be described below with reference to FIGS. 12 and 13.

Structure for Holding Partition Sheet

As mentioned above, the heat exchanger (10) of the present embodiment includes a plurality of first elements (20) and a plurality of second elements (50). In each element (20, 50), a partition sheet (15) is provided to cover the back surface of the frame (25, 55). Thus, in each frame (25, 55), the entire back surface of the blocking portion (31, 61) is covered with the partition sheet (15).

As mentioned above, the heat exchanger (10) of the present embodiment includes the first elements (20) and the second elements (50) alternately stacked on top of each other. The partition sheet (15) of each element (20, 50) is held between the first frame (25) and the frame portion (60) of the second frame (55) of the frame portion (30) which are adjacent to the partition sheet (15).

Specifically, the partition sheet (15) of the first element (20) is sandwiched between a portion of the back surface of the blocking portion (31) of the frame portion (30) located inward of the elongated recess (35) and a portion of the front surface of the blocking portion (61) of the second frame (55) located inward of the ridge (64). Specifically, the partition sheet (15) of the second element (50) is sandwiched between a portion of the back surface of the blocking portion (61) of the frame portion (60) located inward of the elongated recess (65) and a portion of the front surface of the blocking portion (31) of the first frame (25) located inward of the ridge (34).

Gaps Between First Frames and Second Frames

The ridge (64) of the second frame (55) located on the back side of the first frame (25) fits into the elongated recess (35) of the first frame (25). The width W2 of the elongated recess (35) is greater than the sum of the width W1 of the ridge (64) and the thickness T of the partition sheet (15) (W2>W1+T). A gap (82) is provided between the partition sheet (15) covering the side surface (the left side surface in FIG. 12) of the elongated recess (35) and the side surface (the right side surface in FIG. 12) of the ridge (64).

The depth H2 of the elongated recess (35) is greater than the sum of the height H1 of the ridge (64) and the thickness T of the partition sheet (15) (H2>H1+T). A gap (82) is provided between the partition sheet (15) covering the bottom surface (the lower surface in FIG. 12) of the elongated recess (35) and the tip end face (the upper surface in FIG. 12) of the ridge (64).

The ridge (34) of the first frame (25) located on the back side of the second frame (55) fits into the elongated recess (65) of the second frame (55). The width W2 of the elongated recess (65) is greater than the sum of the width W1 of the ridge (34) and the thickness T of the partition sheet (15) (W2>W1+T). A gap (82) is provided between the partition sheet (15) covering the side surface (the left side surface in FIG. 12) of the elongated recess (65) and the side surface (the right side surface in FIG. 12) of the ridge (34).

The depth H2 of the elongated recess (65) is greater than the sum of the height H1 of the ridge (34) and the thickness T of the partition sheet (15) (H2>H1+T). A gap (82) is provided between the partition sheet (15) covering the bottom surface (the lower surface in FIG. 12) of the elongated recess (65) and the tip end face (the upper surface in FIG. 12) of the ridge (34).

As described above, a gap (82) along the tip end face and the side surface of the ridge (34, 64) is provided between the elongated recess (35, 65) of the frame (25, 55) and the ridge (34, 64) fitted into the elongated recess (35, 65). The gap (82) is provided over the entire length of the blocking portion (31, 61) of each frame (25, 55) (in other words, the entire length of the partition wall (30b, 60b)). Thus, the gap (82) communicates with the first communication openings (22) at its one end and communicates with the second communication openings (52) at its other end.

Blocking Between Notch and Seal

As mentioned above, the notches (38, 68) are provided in the frame portion (30, 60) of each frame (25, 55). In the heat exchanger (10), the first notches (38) of the first frame (25) are adjacent to the second partition wall (60b) of the frame portion (60) of the second frame (55). In other words, the first notches (38) of the first frame (25) are provided in portions of the first partition wall (30b) along the second partition wall (60b) of the second frame (55). The second notches (68) of the second frame (55) are adjacent to the first partition wall (30b) of the frame portion (30) of the first frame (25). In other words, the second notches (68) of the second frame (55) are provided in portions of the second partition wall (60b) along the first partition wall (30b) of the first frame (25).

In the heat exchanger (10), the first notch (38) and the second notch (68) adjacent to each other in the stacking direction of the element (20, 50) are arranged in a row. The first notch (38) and the second notch (68) arranged in a row form a notch row (80) (see FIG. 1).

As illustrated in FIG. 13, the notches (38, 68) forming a notch row (80) cross a gap (82) provided between the elongated recess (35, 65) of the frame (25, 55) and the ridge (34, 64) fitted into the elongated recess (35, 65). In other words, the gap (82) extending along the extending direction of the partition wall (30b. 60b) of the frame (25, 55) is divided by the notches (38, 68) halfway from one end to the other end.

The depth D of each notch (38, 68) is substantially equal to the width W2 of the elongated recess (35, 65) of the frame (25, 55) (D=W2) Thus, the gap (82) provided between the elongated recess (35, 65) and the ridge (34, 64) is exposed to the side surfaces of the notches (38, 68) over the entire cross section crossing the extending direction of the gap (82).

Although not shown in FIG. 13, the heat exchanger (10) is provided with seals (81) to fill the respective notch rows (80). The seals (81) are in close contact with the surfaces of the respective notches (38, 68) each constituting the notch row (80) and cover the entire surfaces thereof. Thus, the entire cross-sectional surface of the gap (82) that is open to the side surfaces of the notches (38, 68) and crosses the extending direction of the gap (82) is covered with the seals (81). As a result, the gap (82) that is open on the side surfaces of the notches (38, 68) is closed with the seals (81).

As described above, the gap (82) provided between the elongated recess (35, 65) and the ridge (34, 64) is divided by the notches (38, 68) halfway in the extending direction, and is blocked by the seals (81) at the divided portions. As a result, the flow of air from the one end to the other end of the gap (82) extending along the partition wall (30b, 60b) of the frame (25, 55) is blocked by the seals (81).

Method for Manufacturing Heat Exchanger

A method for manufacturing the heat exchanger (10) will be described. The method for manufacturing a heat exchanger (10) of the present embodiment includes: stacking, filling, and solidifying conducted in this order.

In the stacking, a plurality of first elements (20) and a plurality of second elements (50) are provided, and are stacked alternately. When the first elements (20) and the second elements (50) are alternately stacked, the partition sheets (15) and the frames (25, 55) are alternately stacked. As a result, a plurality of first passages (21) and a plurality of second passages (51) separated by the partition sheets (15) are provided.

The first elements (20) and the second elements (50) stacked are fixed to each other to form a stack. In the stack, the elements (20, 50) stacked are fixed to each other with bolts penetrating the elements (20, 50) in the stacking direction and nuts attached to the bolts. In this stack, the elements (20, 50) stacked may be fixed to each other by adhesion.

In the stack formed in the stacking, corresponding notches (38, 68) provided in the frames (25, 55) of the elements (20, 50) are aligned in a row in the stacking direction of the elements (20, 50). The corresponding notches (38, 68) aligned in a row form a notch row (80).

In the filling, all notch rows (80) in the stack are filled with a filler having fluidity. The filler having fluidity may be a fluid having a relatively high viscosity such as a silicon sealing agent. In the stack which has undergone the filling, the notches (38, 68) constituting the notch rows (80) are filled with a filler.

In the solidifying, the filler with which the notch rows are filled in the filling is solidified. Specifically, in the solidifying, the stack which has undergone the filling is heated for a predetermined time, or kept at room temperature for a predetermined time in order to vaporize a solvent component contained in the filler. As a result, the filler with which the notch rows (80) are filled is solidified to form seals (81).

Feature (1) of Embodiment

In the heat exchanger (10) of the present embodiment, notches (38, 68) are provided in each of the first frames (25) and the second frames (55). The notches (38, 68) in each frame (25, 55) are provided at predetermined positions in the partition wall (30b, 60b) of the frame portion (30, 60). In the heat exchanger (10), a gap (82) communicating with the first communication openings (22) and the second communication openings (52) is provided between the partition walls (30b, 60b) of an adjacent pair of frames (25, 55). The gap (82) is open on the side surfaces of the notches (38, 68) which are open on the outer surface of the partition wall (30b, 60b). The gap (82) is blocked with the seals (81) covering the surfaces of the notches (38, 68). As a result, flow of air from one of the first passage (21) or the second passage (51) toward the other through the gap (82) is blocked by the seals (81), thereby improving airtightness of the heat exchanger (10).

Feature (2) of Embodiment

In the heat exchanger (10) of the present embodiment, the surfaces of the notches (38, 68) are covered with the seals (81) provided to fill the notches (38, 68). Thus, the gap (82) that is open on the side surfaces of the notches (38, 68) is blocked reliably by the seals (81).

Feature (3) of Embodiment

In the heat exchanger (10) of the present embodiment, the ridge (34, 64) of one of an adjacent pair of the spacing members (25, 55) fits into the elongated recess (35, 65) of the other. In the heat exchanger (10), the entire surface of the ridge (34, 64) does not completely come into close contact with the entire surface of the elongated recess (35, 65). Thus, the gap (82) is provided between the ridge (34, 64) and the elongated recess (35, 65) which are fitted to each other. The gap (82) is blocked with the seals (81) covering the surfaces of the notches (38, 68) of each spacing member (25, 55).

Feature (4) of Embodiment

In each frame (25, 55) provided for the heat exchanger (10) of the present embodiment, the depth D of the notches (38, 68) is greater than the width W1 of the ridge (34, 64), and equal to the width W2 of the elongated recess (35, 65). Thus, the gap (82) provided between the ridge (34, 64) and the elongated recess (35, 65) is divided by the notches (38, 68) over the entire width thereof. As a result, the gap (82) provided between the ridge (34, 64) and the elongated recess (35, 65) is blocked with the seals (81) covering the surfaces of the notches (38, 68).

Feature (5) of Embodiment

In the heat exchanger (10) of the present embodiment, the notches (38, 68) are provided in both sides of the communication section (30a, 60a) in the frame portion (30, 60) of each frame (25, 55). Thus, the gap (82) provided between frame portions (30, 60) of an adjacent pair of the frames (25, 55) is blocked with the seals (81) covering the surfaces of the notches (38, 68), from the communication openings (22, 52) provided in the communication section (30a, 60a).

Feature (6) of Embodiment

In the heat exchanger (10) of the present embodiment, the corresponding notches (38, 68) in the frames (25, 55) are aligned in a row in the stacking direction of the frames (25, 55). Thus, the time required to provide the seals (81) on the notches (38, 68) can be reduced.

Feature (7) of Embodiment

The method for manufacturing a heat exchanger (10) of the present embodiment includes: stacking, filling, and solidifying conducted in this order. In the stacking, the first elements (20) and the second elements (50) are alternately stacked. In the filling, the notches (38, 68) are filled with a filler having fluidity. In the solidifying, the filler with which the notches (38, 68) are filled is solidified to form seals (81). Thus, the time required to provide the seals (81) on the notches (38, 68) can be reduced.

First Variation of Embodiment

Figure 14:
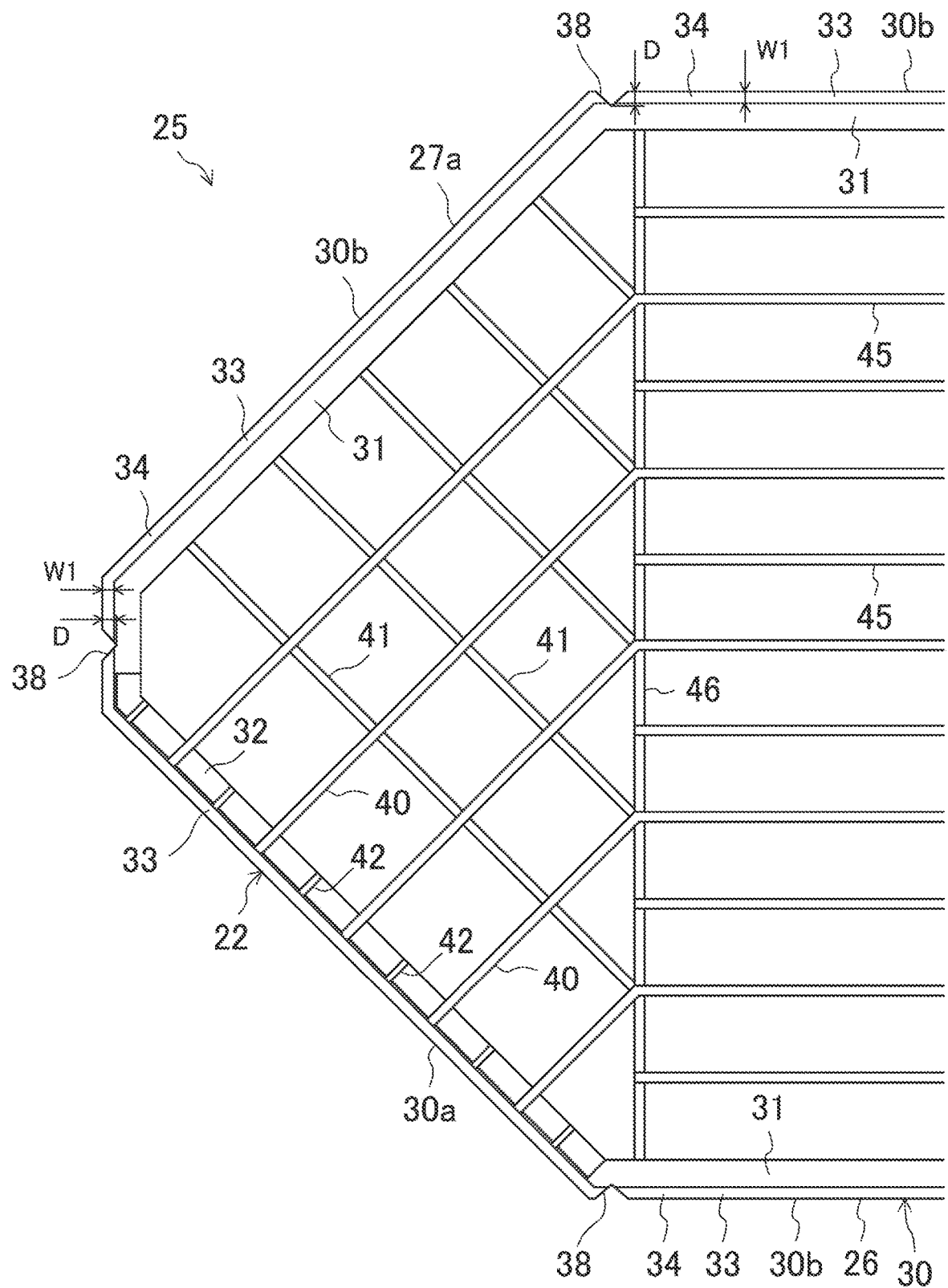
FIG. 14 is a plan view of portion of the first frame of a first variation of the embodiment.
Figure 15:
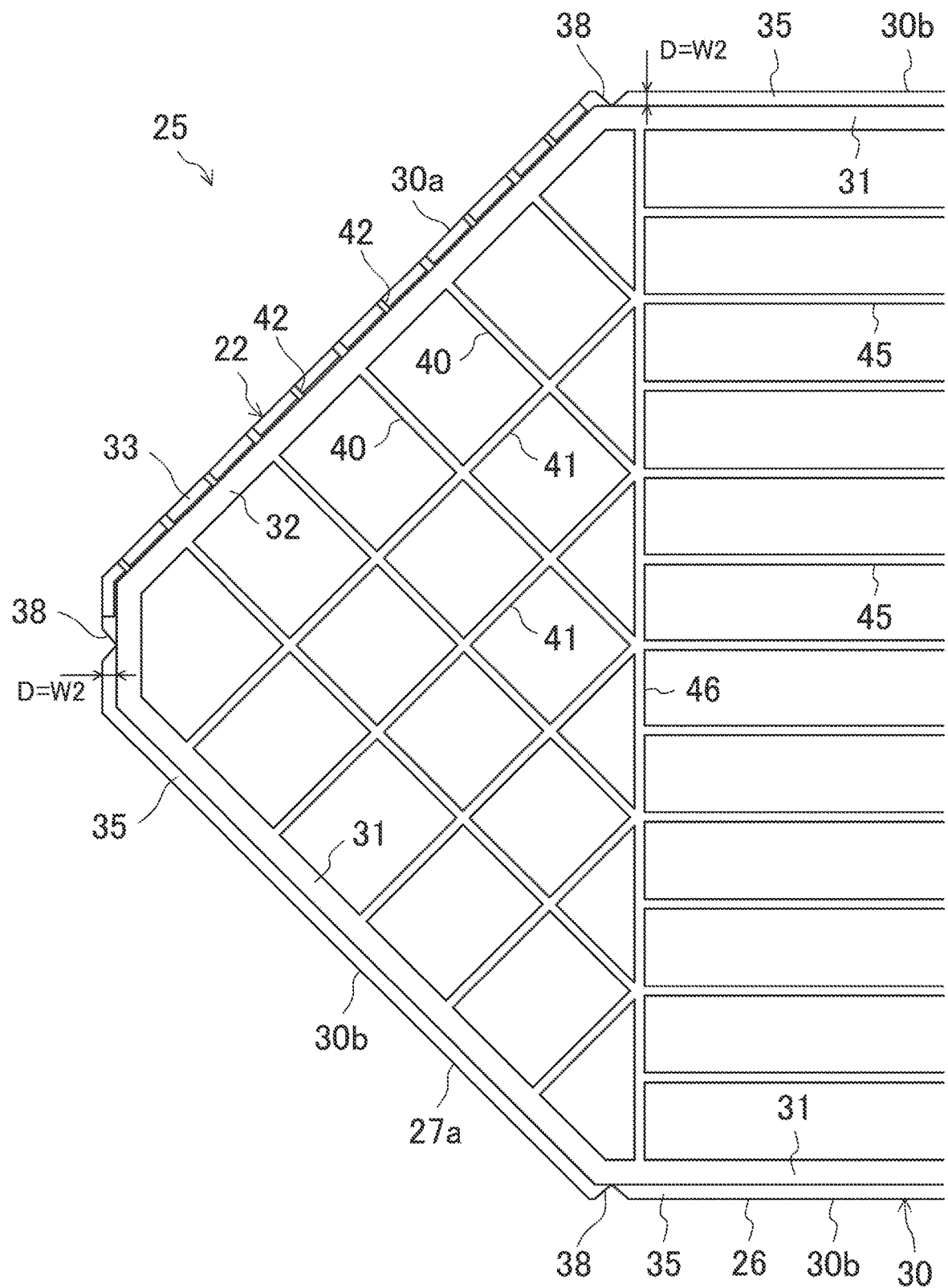
FIG. 15 is a bottom view of portion of the first frame of the first variation of the embodiment.
Figure 16:
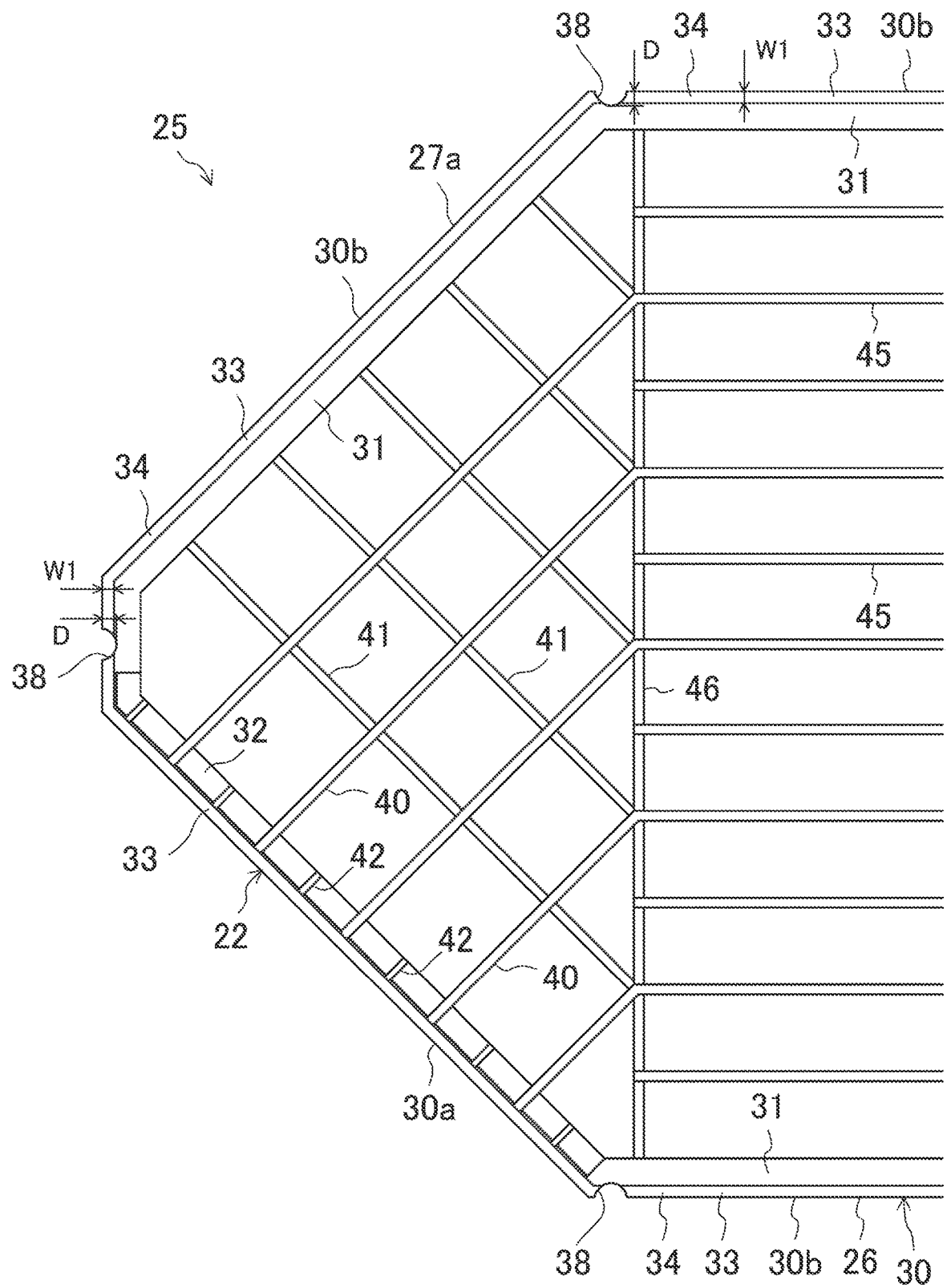
FIG. 16 is a plan view of portion of the first frame of the other first variation of the embodiment.
Figure 17:
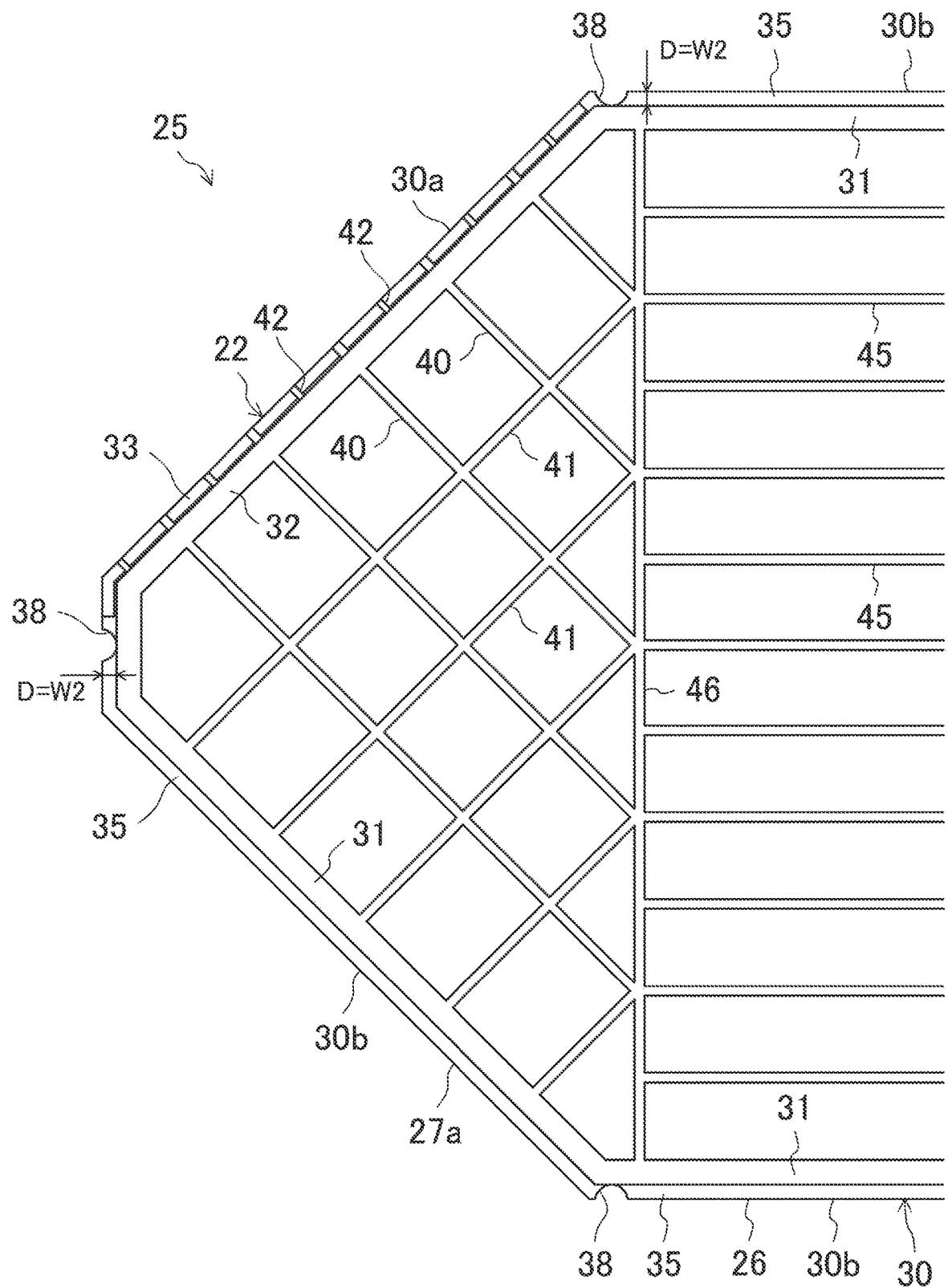
FIG. 17 is a bottom view of portion of the first frame of the other first variation of the embodiment.

In the heat exchanger (10) of the present embodiment, the shape of the notch (38, 68) is not limited to the rectangular shape in plan view. For example, as illustrated in FIGS. 14 and 15, the shape of the notch (38, 68) may be a triangular shape in plan view. For example, as illustrated in FIGS. 16 and 17, the shape of the notch (38, 68) may be a semicircular shape in plan view. The depth D of the notches (38, 68) is greater than the width W1 of the ridge (34, 64) and substantially equal to the width W2 of the elongated recess (35, 65), regardless of the shape of the notches (38, 68).

Second Variation of Embodiment

Figure 18:
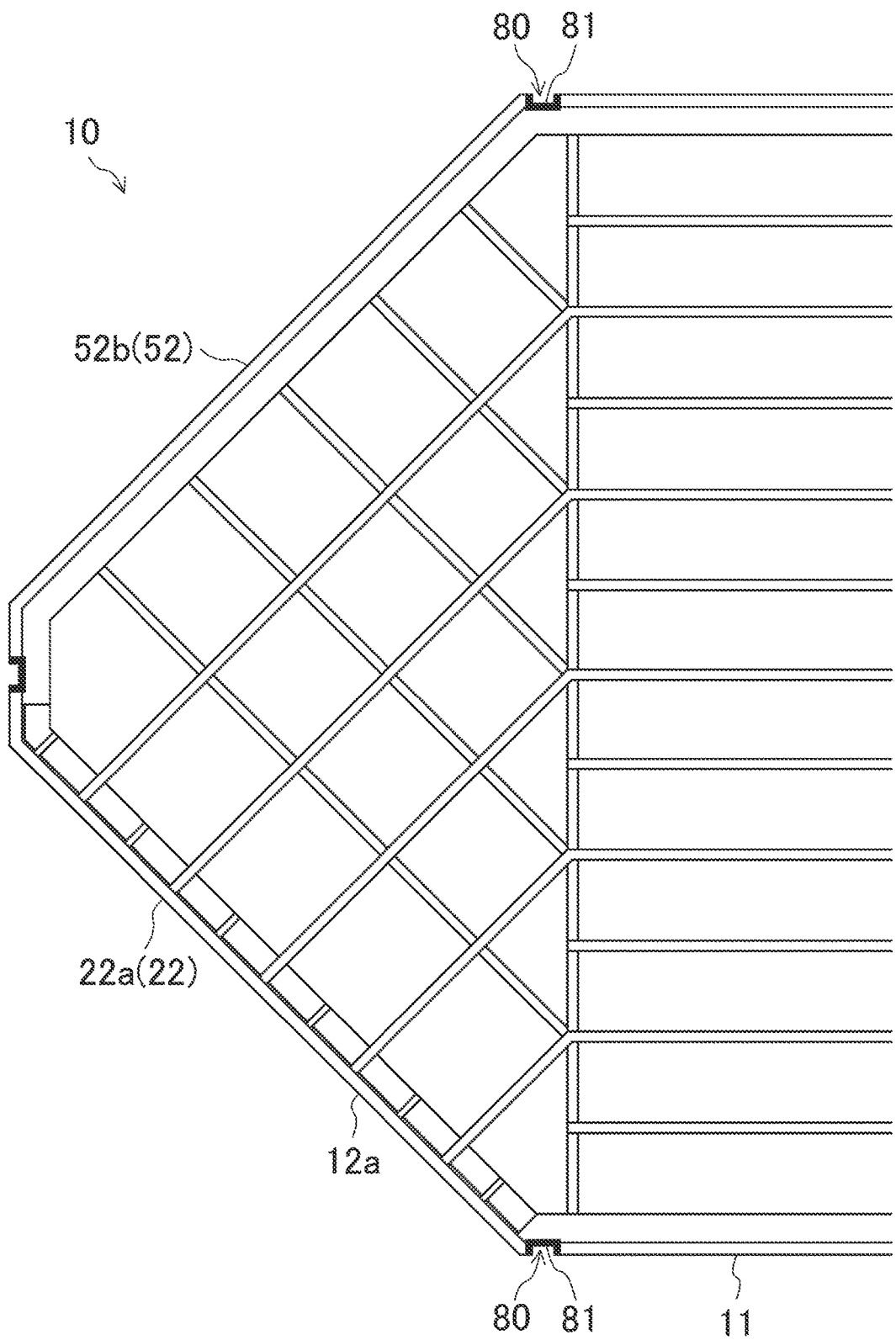
FIG. 18 is a partially enlarged view of a plan view corresponding to FIG. 3 of the heat exchanger of a second variation of the embodiment.

In the heat exchanger (10) of the above embodiment, the seals (81) merely need to be provided to cover the surfaces of the notches (38, 68), and do not need to be provided to fill the notches (38, 68). For example, as illustrated in FIG. 18, the seals (81) may be a thick film covering the surfaces of the notches (38, 68).

Third Variation of Embodiment

In each element (20, 50) of the heat exchanger (10) of the above embodiment, the partition sheet (15) may cover only part of the back surface of the blocking portion (31, 61) of the frame (25, 55).

Figure 19:
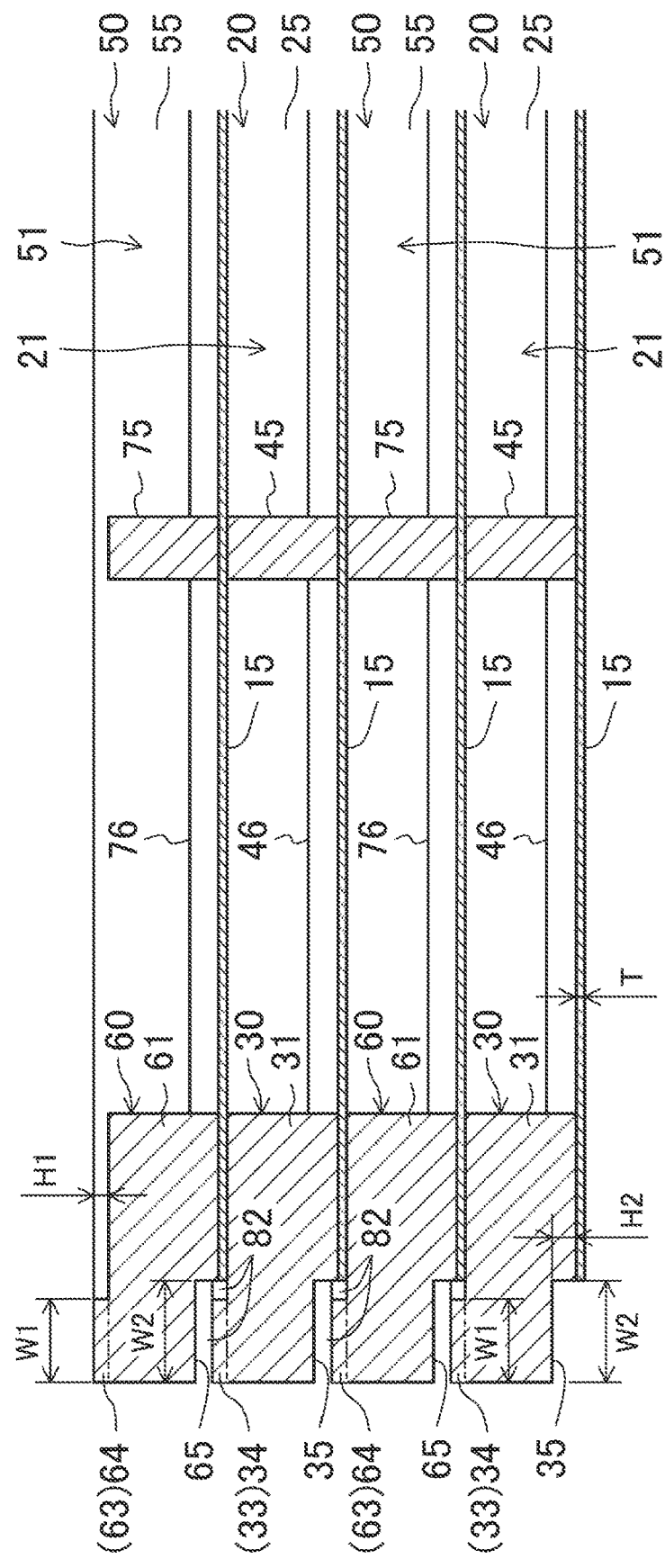
FIG. 19 is a cross-sectional view of a cross section corresponding to FIG. 12 of the heat exchanger of a third variation of the embodiment.

In each element (20, 50) shown in FIG. 19, the partition sheet (15) covers part of the back surface of the blocking portion (31, 61) inward of the elongated recess (35, 65), but does not cover the surface of the elongated recess (35, 65). In the variation shown in FIG. 19, the width W2 of the elongated recess (35, 65) is greater than the width W1 of the ridge (34, 64) (W2>W1). A gap (82) is provided between the side surface (the left side surface in FIG. 19) of the elongated recess (35, 65) and the side surface (the right side surface in FIG. 19) of the ridge (34, 64). The depth H2 of the elongated recess (35, 65) is greater than the height H1 of the ridge (34, 64) (H2>H1). A gap (82) is provided between the bottom surface (the bottom surface in FIG. 19) of the elongated recess (35, 65) and the tip end face (the upper surface in FIG. 19) of the ridge (34, 64).

Fourth Variation of Embodiment

In each element (20, 50) of the heat exchanger (10) of the above embodiment, the structures of the ridge (34, 64) and the elongated recess (35, 65) provided in the frame portion (30, 60) are not limited to those mentioned above.

Figure 20:
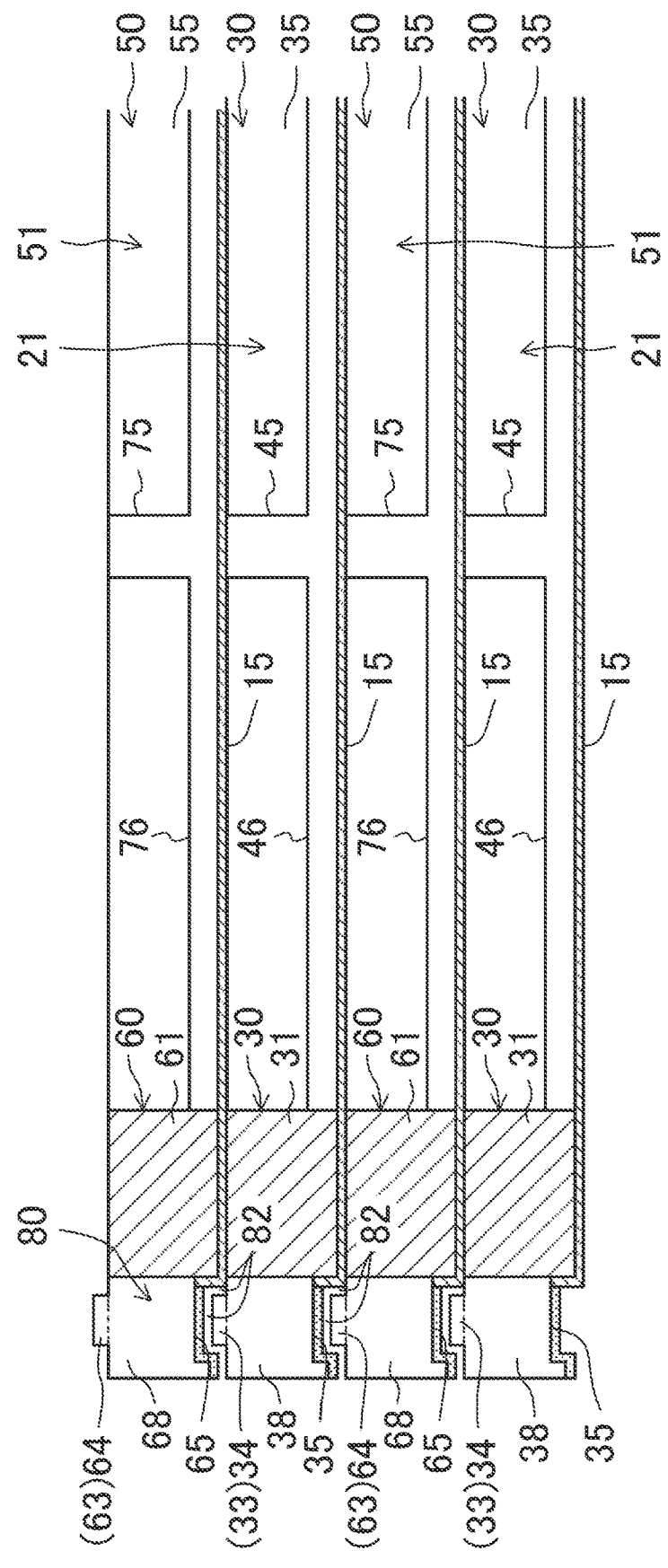
FIG. 20 is a cross-sectional view of a cross section corresponding to FIG. 13 of the heat exchanger of a fourth variation of the embodiment.

For example, as illustrated in FIG. 20, the ridge (34, 64) may be arranged inward of the outermost peripheral edge of the blocking portion (31, 61) in the frame portion (30, 60) of each element (20, 50). In this case, the elongated recess (35, 65) into which the ridge (34, 64) fits has a recessed groove shape that is open only on the back surface of the blocking portion (31, 61), and is not open on the outer peripheral surface of the blocking portion (31, 61).

Although not shown in the drawings, a plurality of ridges (34, 64) may be provided in the blocking portion (31, 61) of the frame portion (30, 60) of each element (20, 50). In this case, the ridges (34, 64) extend in the extending direction of the blocking portion (31, 61) and are substantially parallel to each other. In this case, the same number of elongated recesses (35, 65) as the ridges (34, 64) are provided in the back surface of the blocking portion (31, 61) of each frame portion (30, 60). The elongated recesses (35, 65) extend in the extending direction of the blocking portion (31, 61), and are substantially parallel to each other. Into each elongated recess (35, 65), a corresponding one of the ridges (34, 64) fits.

Fifth Variation of Embodiment

The heat exchanger (10) of the above embodiment may be a sensible heat exchanger that causes the supply air and the exhaust air to exchange sensible heat only. In this case, the partition sheets (15) of the heat exchanger (10) are made of a material having low or no moisture permeability (e.g., a resin film or a thin metal plate).

Sixth Variation of Embodiment

The shape of the heat exchanger (10) of the above embodiment is not limited to an octagonal prism. The shape of the heat exchanger (10) may be, for example, a hexagonal prism or a quadrangular prism. When the heat exchanger (10) has a hexagonal prism shape, each of the auxiliary heat exchange sections (12a, 12b) has a triangular shape in plan view (corresponding to FIG. 2) of the heat exchanger (10).

While the embodiments and variations thereof have been described above, it will be understood that various changes in form and details may be made without departing from the spirit and scope of the claims. The above-described embodiments and variations may be combined and replaced with each other without deteriorating intended functions of the present disclosure. The ordinal numbers such as "first," "second," "third," . . . in the description and claims are used to distinguish the terms to which these expressions are given, and do not limit the number and order of the terms.

As can be seen from the foregoing description, the present disclosure is useful for a heat exchanger and a manufacturing method for the same.

The invention claimed is:

1. A heat exchanger, comprising:
a plurality of flat sheet shaped partition members;
spacing members alternately stacked with the partition members to keep a space between an adjacent pair of the partition members; and
seals,
the partition members each being sandwiched between a first passage and a second passage alternately provided,
the spacing members including a first spacing member forming the first passage and a second spacing member forming the second passage,
the first spacing member and the second spacing member each having a frame portion along a periphery of the partition members,
the frame portion of the first spacing member having
a first communication section having a first communication opening allowing the first passage to communicate with outside of the frame portion and
a first partition wall separating the first passage from the outside of the frame portion,
the frame portion of the second spacing member having a second communication section having a second communication opening allowing the second passage to communicate with outside of the frame portion and a second partition wall separating the second passage from the outside of the frame portion, the frame portion of the first spacing member further having first notches provided in portions of the first partition wall along the second partition wall of the second spacing member and open on an outer side surface of the first partition wall, the frame portion of the second spacing member further having second notches provided in portions of the second partition wall along the first partition wall of the first spacing member and open on an outer side surface of the second partition wall, the seals covering surfaces of the first notches and surfaces of second notches, the frame portion of the first spacing member and the frame portion of the second spacing member each having a ridge provided in one surface in a stacking direction of the plurality of partition members and extending in an extending direction of the frame portion, and an elongated recess provided in the other surface and extending in the extending direction of the frame portion, and the ridge of one of the first spacing member and the second spacing member adjacent to each other fitting into the elongated recess of an other one of the first spacing member and the second spacing member adjacent to each other.

2. The heat exchanger of claim 1, wherein
the seals are provided to fill the first notches and the second notches.

3. The heat exchanger of claim 1, wherein
the first spacing member and the second spacing member each have the ridge and the elongated recess in an outermost periphery of the frame portion, and a width of the elongated recess is greater than a width of the ridge, a depth of each of the first notches is equal to a width of the elongated recess of the first spacing member, and a depth of each of the second notches is equal to a width of the elongated recess of the second spacing member.

4. The heat exchanger of claim 1, wherein
in the frame portion of the first spacing member, the first notches are provided at positions adjacent to one end of the first communication section and positions adjacent to an other end of the first communication section, and in the frame portion of the second spacing member, the second notches are provided at positions adjacent to one end of the second communication section and positions adjacent to an other end of the second communication section.

5. The heat exchanger of claim 1, wherein
an associated one of the first notches and an associated one of the second notches are arranged in a row in a stacking direction of the first spacing member and the second spacing member.

6. The heat exchanger of claim 2, wherein
the first spacing member and the second spacing member each have the ridge and the elongated recess in an outermost periphery of the frame portion, and a width of the elongated recess is greater than a width of the ridge, a depth of each of the first notches is equal to a width of the elongated recess of the first spacing member, and a depth of each of the second notches is equal to a width of the elongated recess of the second spacing member.

7. A method of manufacturing a heat exchanger, the method comprising:

alternately stacking partition members and spacing members and forming a first passage and a second passage separated by the partition members, the partition members being flat sheet shaped partition members, the spacing members being members having frame portions along peripheries of respective partition members to keep a space between an adjacent pair of the partition members, and the frame portion of each spacing member having a ridge provided in one surface in a stacking direction of the plurality of partition members and extending in an extending direction of the frame portion, and an elongated recess provided in the other surface and extending in the extending direction of the frame portion, the ridge of one of the spacing members adjacent to each other fitting into the elongated recess of an other one of the spacing members adjacent to each other;

filling, with a filler having fluidity, notches, the notches being provided in partition walls and being open on outer surfaces of the partition walls, the partition walls being portions of the frame portions of the spacing members where the first passage or the second passage corresponding to the frame portions are separated from outside of the frame portions; and solidifying the filler with which the notches are filled to form seals covering surfaces of the notches.

* * * * *